United States Patent
Damodaran et al.

(10) Patent No.: US 11,762,858 B2
(45) Date of Patent: *Sep. 19, 2023

(54) SYSTEMS AND METHODS FOR ANALYZING DISTRIBUTED SYSTEM DATA STREAMS USING DECLARATIVE SPECIFICATION, DETECTION, AND EVALUATION OF HAPPENED-BEFORE RELATIONSHIPS

(71) Applicant: The MITRE Corporation, McLean, VA (US)

(72) Inventors: Suresh K. Damodaran, Acton, MA (US); Richard A. Moffitt, McLean, VA (US); Richard B. Lamourine, Medford, MA (US); Joshua D. Guttman, Newton, MA (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/824,166

(22) Filed: Mar. 19, 2020

(65) Prior Publication Data

US 2021/0294805 A1    Sep. 23, 2021

(51) Int. Cl.
*G06F 16/245* (2019.01)
*G06F 16/2455* (2019.01)

(52) U.S. Cl.
CPC .. *G06F 16/24558* (2019.01); *G06F 16/24568* (2019.01)

(58) Field of Classification Search
None
See application file for complete search history.

(56) References Cited

U.S. PATENT DOCUMENTS 6,275,956 B1    8/2001  On et al.
6,327,587 B1 *  12/2001 Forster .............. G06F 16/24539
(Continued)

FOREIGN PATENT DOCUMENTS

WO   2011/019706 A1    2/2011
WO   2016/124230 A1    8/2016

OTHER PUBLICATIONS

Allinea DDT User Guide (2012) Allinea DDT, Allinea Software Version 3.2.1-27702, retrieved from http://www.scc.kit.edu/scc/docs/HP-XC/ddt/userguide_3.2.1.pdf; 139 pages.
(Continued)

*Primary Examiner* — Son T Hoang
(74) *Attorney, Agent, or Firm* — MORRISON & FOERSTER LLP

(57) ABSTRACT

Predefined patterns are detected in streaming data being transmitted in a distributed computing system that contains a plurality of computing devices wherein the plurality of computing devices are collectively configured to execute a distributed software program. In one or more examples, a detection engine can be implemented on a computing device and can be configured to receive streaming data that is being transmitted between computing devices of the system. The detection engine can be further configured to analyze the streaming data to determine if the data matches one or more patterns that is specified by a watch point which can be converted into a happened before language expression. In one or more examples, the streaming data can be converted into an intermediate log file that is compared against patterns expressed by a regular expression and if a match is found, an alert can be generated.

27 Claims, 19 Drawing Sheets

(56) References Cited

U.S. PATENT DOCUMENTS

| | | | |
|---|---|---|---|
| 6,611,955 B1 | | 8/2003 | Logean et al. |
| 7,661,032 B2 | | 2/2010 | Eberbach et al. |
| 7,747,641 B2 | | 6/2010 | Kim et al. |
| 8,266,600 B2 | | 9/2012 | Kahlon et al. |
| 8,504,994 B2 | | 8/2013 | Golender et al. |
| 8,826,242 B2 | | 9/2014 | Livshits et al. |
| 8,842,119 B2 | | 9/2014 | Hubbard |
| 8,972,945 B2 | | 3/2015 | Bates |
| 9,158,741 B1 | | 10/2015 | Hansen |
| 9,306,962 B1 | | 4/2016 | Pinto |
| 9,658,943 B2 | | 5/2017 | Gounares |
| 9,747,316 B2 | | 8/2017 | Baum et al. |
| 10,521,331 B1 | * | 12/2019 | Damodaran ...... G06F 16/24558 |
| 2003/0028858 A1 | | 2/2003 | Hines |
| 2005/0108384 A1 | | 5/2005 | Lambert et al. |
| 2005/0278699 A1 | * | 12/2005 | Buskens ........... G06F 16/24568 |
| 2006/0085667 A1 | | 4/2006 | Kubota et al. |
| 2009/0276660 A1 | | 11/2009 | Griffith et al. |
| 2010/0100893 A1 | * | 4/2010 | Klissner ........... G06F 16/24568 |
| 2012/0233300 A1 | | 9/2012 | Marmolejo-Meillon et al. |
| 2012/0246303 A1 | * | 9/2012 | Petersen ............. G06F 16/1734 |
| 2013/0318504 A1 | | 11/2013 | Eker et al. |
| 2014/0075416 A1 | | 3/2014 | Waldon et al. |
| 2014/0366006 A1 | | 12/2014 | Gottschlich et al. |
| 2016/0224402 A1 | | 8/2016 | Togawa |
| 2016/0337400 A1 | * | 11/2016 | Gupta ................. G06F 16/2455 |
| 2016/0359872 A1 | | 12/2016 | Yadav et al. |
| 2017/0013289 A1 | | 1/2017 | Nightingale et al. |
| 2017/0270297 A1 | * | 9/2017 | Watanabe ......... G06F 16/24558 |
| 2017/0289187 A1 | * | 10/2017 | Noel ....................... G06F 16/28 |
| 2018/0260299 A1 | * | 9/2018 | Mola ....................... G06F 16/22 |
| 2018/0309648 A1 | | 10/2018 | Debnath et al. |
| 2019/0095494 A1 | * | 3/2019 | Bhattacharjee ... G06F 16/24554 |
| 2019/0215340 A1 | * | 7/2019 | Klaedtke ................. G06F 16/24 |
| 2019/0243746 A1 | * | 8/2019 | Damodaran ...... G06F 16/24558 |
| 2019/0243753 A1 | | 8/2019 | Zhang et al. |
| 2019/0260299 A1 | * | 8/2019 | Hildebrandt .......... G06F 16/245 |
| 2019/0266170 A1 | | 8/2019 | Hazel et al. |
| 2019/0319978 A1 | * | 10/2019 | Giffard ............... G06F 16/2255 |
| 2019/0370148 A1 | * | 12/2019 | Du ........................ G06F 16/284 |
| 2020/0019484 A1 | * | 1/2020 | Kolesnik ........... G06F 16/24568 |
| 2020/0137084 A1 | * | 4/2020 | Roy .................... G06F 16/2455 |
| 2020/0287929 A1 | * | 9/2020 | Biever, Jr. .............. G06F 16/23 |

OTHER PUBLICATIONS

Damodaran et al., U.S. Office Action dated Nov. 1, 2019 directed to U.S. Appl. No. 15/892,200; 6 pages.

Gao et al., "SAQL: A Stream-based Query System for Real-Time Abnormal System Behavior Detection", USENIX Security Symposium, Aug. 15-17, 2018, Baltimore, Maryland; pp. 639-656.

Haban, D. et al. (1988) "Global Events and Global Breakpoints in Distributed Systems," System Sciences, Software Track, Proceedings of the Twenty-First Annual Hawaii International Conference, vol. 2, IEEE; 10 pages.

Kottke (Apr. 2011) "Magical regular expression generator," located at https://kottke.org/11/04/magical-regular-expression-generator (1 page).

Kumaran (2013). "Event Stream Database Based on Architecture to Detect Network Intrusion (Industry Article)"; pp. 241-247.

Okumura, Masaru et al., (2016) "Constructing a Log Collecting System using Splunk and its Application for Service Support," Proceedings of the 2016 ACM on SIGUCCS Annual Conference; 4 pages.

Perrochon, L. et al., (2000) "Enlisting Event Patterns for Cyber Battlefield Awareness," DARPA Information Survivability Conference and Exposition, 2000 DISCEX'00 Proceedings, vol. 2; 12 pages.

Spadaro (Jul. 12, 2013) "Event Correlation for Detecting Advanced Multi-stage Cyber-attacks" Delft University of Technology M.Sc Thesis; 151 pages.

Stroeh et al.,(2013). "An approach to the correlation of security event based on machine learning techniques" Journal of Internet Services and Applications 4(7): 16 pages.

Tarafdar, A. et al. (1998) "Predicate Control for Active Debugging of Distributed Programs," Parallel Processing Symposium IPPS/SPDP, Proceedings of the First Merged International . . . and Symposium on Parallel and Distributed Processing; 7 pages.

The Distributed Debugging Tool User Guide v1.10, (2006) User Guide Allinea, retrieved from http://icc.dur.ac.uk/Computing/DDT/userguide.pdf; 100 pages.

Ulrich, A. et al., (2003) "Verifying Trustworthiness Requirements in Distributed Systems with Formal Log-file Analysis," System Sciences, 2003 Proceedings of the 36 Annual Hawaii International Conference IEEE; 10 pages.

Yang, Chaoyu (2015) "Easier Spark Code Debugging Real-Time Progress Bar and Apache Spark's web UI Integration in Databricks," Company Blog, Databricks, retrieved from https://databricks.com/blog/2015/09/23/easier-spark-code-debugging-real-time-progress-bar-and-apache-spark-web-ui-integration-in-databricks.html; 3 pages.

"Regexptranslate Translate text into regular expression" located at https://web.archive.org/web/20180213144228/https://www.mathworks.com/help/ matlab/ref/regexptranslate.html visted on Feb. 13, 2018. (4 pages).

* cited by examiner

SYSTEMS AND METHODS FOR ANALYZING DISTRIBUTED SYSTEM DATA STREAMS USING DECLARATIVE SPECIFICATION, DETECTION, AND EVALUATION OF HAPPENED-BEFORE RELATIONSHIPS

FIELD OF THE DISCLOSURE

This disclosure relates to systems and methods for analyzing streaming data transmitted during the operation of a distributed software program to determine the presence of one or more events conforming to complex event patterns.

BACKGROUND OF THE DISCLOSURE

In the field of computer science, distributed systems have been utilized to allow for faster and more efficient execution of program code that can often prove overly cumbersome and computationally complex for a single stand-alone system to effectively process. A distributed system can refer to a computing mode in which multiple networked computers "work together" by communicating and coordinating their actions to achieve a single result. Distributed systems can be bus based or each individual computing node can be networked to the other computing nodes in the distributed system. In a bus-based system, the components send messages to each other through the bus, by broadcasting the messages to the bus such that every node of the system attached to the bus receives the message. In the context of computing, distributed systems consisting of multiple computers can work together to execute a single program, thereby spreading the computational burdens across the multiple computers so as to not overly burden any single computer.

The multiple computing resources organized in a distributed system can communicate and coordinate their actions by passing along messages to one another. In an example where multiple computers work together to execute a single program, each computer can perform one or more tasks associated with execution of the program, and they can pass messages to another computer in the distributed system, wherein the message can contain information required by the receiver to execute their task within the program.

While distributed systems allow for faster computing speeds by breaking a program down into parts and spreading the computational burden across multiple computers, the process of developing distributed software applications can be difficult because if there is an error in the code, the source of the error may be difficult to ascertain since multiple machines are each running different portions of the overall program, and access to the code that each machine is running individually may not be possible or can be cumbersome to debug.

Debugging programs used to debug distributed software often attempt to identify errors in the source code of the software run by each distributed component by employing a sequential debugger for software in each component. Some distributed system software debuggers focus on the communications between components in the distributed system. These debugging programs, known as replay debuggers, can focus on the communication events between components of the distributed system to detect unintended conditions among the messages or various faults, each of which can provide clues as to the source of the program code error.

Replay debuggers can be characterized as belonging to one of two categories: replay debuggers that replay the execution of the distributed code in its entirety and replay debuggers, wherein only the messages communicated between components of the distributed system are replayed.

In replay debuggers in which only the messages communicated between components of the distributed system are replayed, there has been a long-felt need by programmers to have the ability to focus the replay debugging on a subset of messages either manually or through programmable constraints. Since the execution of a single distributed software program can generate numerous messages between components, providing the developer the ability to focus only on a subset of the messages can be a valuable resource in debugging code.

The execution of a distributed software program may generate thousands upon thousands of messages between components of a distributed system. Thus, if a programmer or developer was seeking to determine when a particular condition in a message occurred, they would ordinarily be required to sift through each and every message generated during execution of the replay debugger to see if the condition occurred. This process can prove to be extremely labor-intensive, further adding to the time and complexity required to perform replay debugging.

Replay debuggers can often use logs of messages generated at each node of the distributed computing system to debug a particular distributed software system. However, examining the logs of messages can often mean that the recognition of a problem in the distributed software code can take place long after the error has occurred. This delay can be on account that using logs of messages rather than the actual streaming messages themselves requires that the system wait for logs to be generated after the message has been transmitted. Thus, performing replay debugging on log files can mean that the time to react is prolonged. Thus, there is a need for a system that is capable of performing replay debugging on the actual data that is streaming through a distributed software system so as shorten the time between when an error event occurs and when a replay debugger is able to detect the occurrence of the event.

As discussed above, the process of analyzing data messages between nodes of a distributed software system can be computationally intensive and complex. This complexity can be made even more complex if the nodes of a distributed system communicate within one another intermittently. The intermittent nature of these communications and/or the bandwidth of these connections can cause unacceptable delay to the debugging process further prolonging the detection of error from the time that the error occurred.

SUMMARY OF THE DISCLOSURE

Accordingly, systems and methods for constrained replay debugging with message communications are provided. In one example, a user interface for a replay debugger can employ a visual progress bar that allows a programmer or developer to visually see the progress of messages being generated by the various components of a distributed system. By being able to visually inspect the messages in an organized fashion that is facilitated by the visual progress bar, a programmer or developer can more efficiently diagnose and debug problems encountered with the execution of their code.

In one or more examples, in conjunction with the visual progress bar, the replay debugger can be configured to allow for the developer to manually constrain or highlight particular messages appearing in the visual progress bar so that only a selected subset of the messages appear or are highlighted. The replay debugger can provide a domain-specific Happened-Before-Language (HBL) to detect order dependent properties among message logs through the specification of HB relationships among the messages, components, and their variable values of components of the system. The language can permit the specification of message types, components, and also logical expressions involving message variables and component variables. Watch points may be defined using HBL to detect specific conditions of the variables' values and message type occurrence. Detection of the watch points may be done in real time by performing analysis on a real-time stream of data being transmitted between two nodes in the distributed software system.

In one or more examples, each data stream in a distributed software system can include a detection engine that can buffer the stream for analysis. In one or more examples, and to facilitate detection, the messages buffered by the detection engine can be converted to a log string in an intermediate standardized format over which watch points are specified using HBL. Regular expressions can be derived from the HBL-based watch point specifications and then applied to the log string. In one or more examples of the disclosure, the term regex can refer to regular expressions or any logical expression. This approach can allow for the detection of watch points in real time or on messages collected in a log file. HBL can be especially useful for detecting order dependent properties in cyber-physical systems.

In one or more examples, the analysis of a stream can employ edge computing techniques in which the analysis is performed at each node of the distributed software system, rather than taking place at a centralized processor.

DETAILED DESCRIPTION OF THE DISCLOSURE

Figure 1:
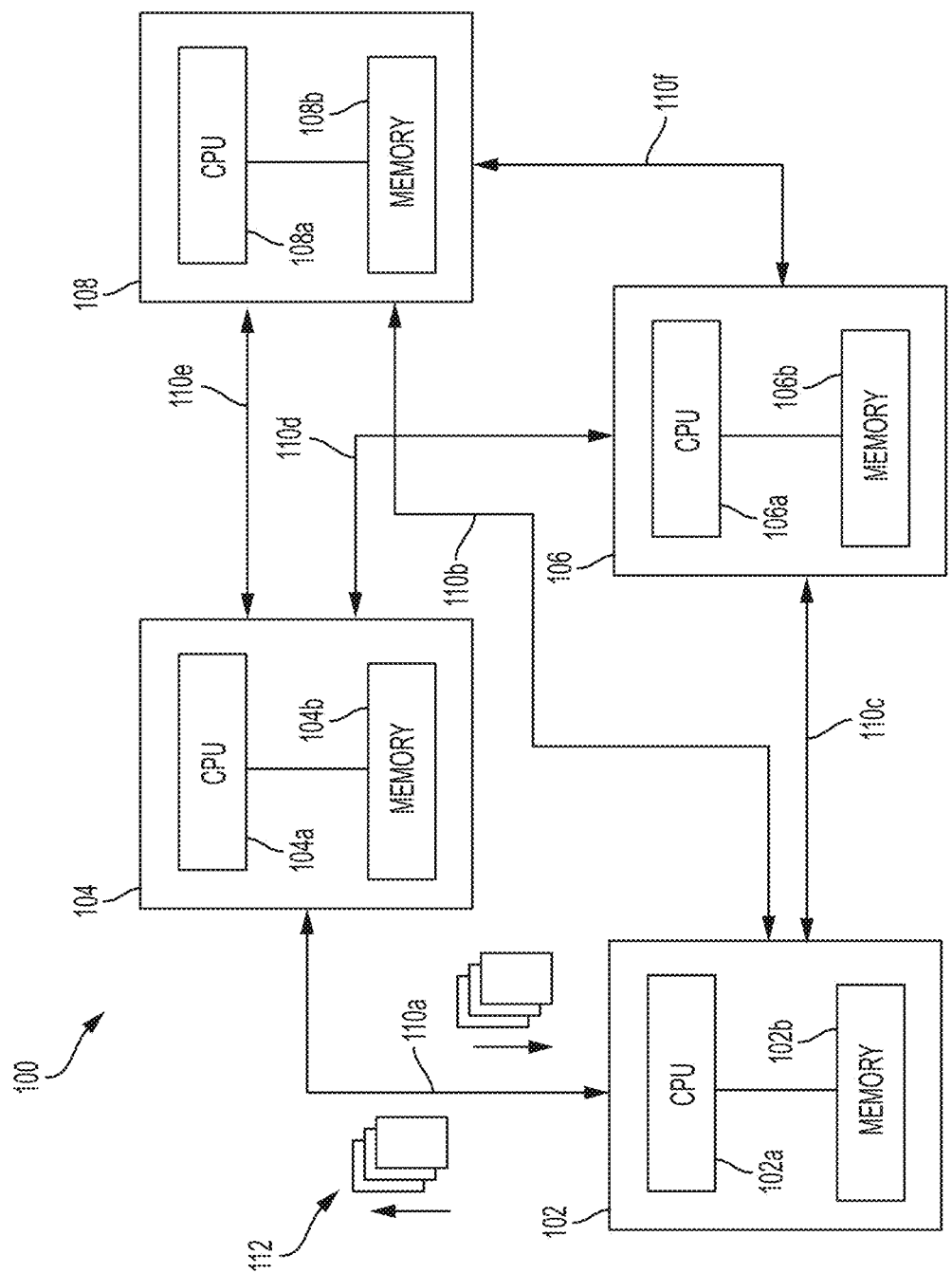
FIG. 1 illustrates an exemplary distributed computing system configured to execute a distributed software program according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present Disclosure include process steps and instructions described herein in the form of an algorithm. It should be noted that the process steps and instructions of the present Disclosure could be embodied in software, firmware, or hardware, and, when embodied in software, they could be downloaded to reside on and be operated from different platforms used by a variety of operating systems.

The present Disclosure also relates to a device for performing the operations herein. This device may be specially constructed for the required purposes or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present Disclosure is not described with reference to any particular programming language. It will be appreciated that a variety of programming languages may be used to implement the teachings of the present Disclosure as described herein.

Described herein are systems and methods for visualizing and replaying messages generated between computing elements in a distributed computing system that is executing distributed software. In one example, the system can provide a user the ability to visualize the various messages associated with the execution of distributed software by providing a visual progress bar that supports the visualization of the chronological progress of messages generated during execution of the distributed software program. The visual progress bar can also be configured to allow for a user of the system to pause the replay, inspect individual messages generated during the execution of the program, track the changes of individual variables associated with the execution of the program, and step through the execution of the distributed program step-by-step at the pace desired by a user of the system.

FIG. 1 illustrates an exemplary distributed computing system configured to execute a distributed software program according to examples of the disclosure. The example of FIG. 1 illustrates a distributed computing system 100 that includes a plurality of computing elements 102, 104, 106, and 108. Each computing element 102, 104, 106, and 108 can include both a processor 102a, 104a, 106a, and 108a and a memory 102b, 104b, 106b, and 108b respectively. The processor and memory of each computing element can be utilized to execute a distributed software program in which portions of the overall program are executed individually by each computing element. The computing elements can coordinate their various actions by passing messages to one another that indicate the status of variables or other information needed by a component to carry out its portion of the distributed program. These messages can be referred to as "log streams" or "log files." The present disclosure thus may use the term log stream and log file interchangeably. In one or more examples, each component of the system 100 (i.e., 102, 104, 106, 108) can generate log streams 112 which can then be stored in a memory (not pictured) thus creating a log file that stores the contents of the log stream.

In one or more examples, each computing element 102, 104, 106, and 108 can be communicatively coupled to one another via communication channels 110a-f. In one or more examples, communications through communications channel 110a-f can be implemented using Wifi, Bluetooth, Ethernet, or any other type of communications channel known in the art to connect two or more computing devices. In one or more examples, each computing element can be connected to every other computing element that is part of the distributed system. Alternatively, each computing element may be connected to only a subset of the computing elements that form the distributed computing system.

Figure 2:
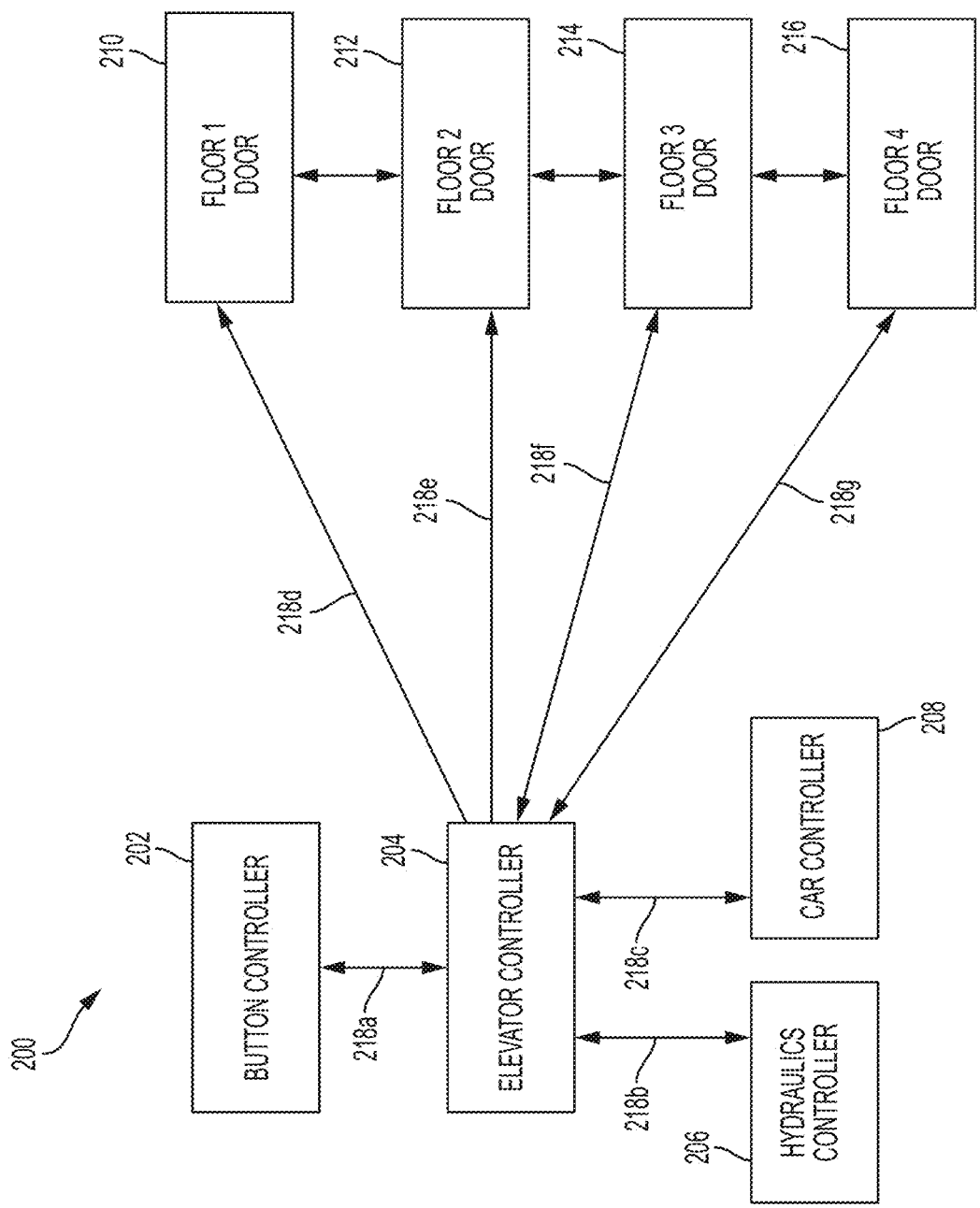
FIG. 2 illustrates an exemplary cyber-physical system that can utilize a distributed computing architecture according to examples of the disclosure.

Distributed computing systems can be utilized to coordinate the activities of multiple computing elements to execute a common task. For instance a cyber-physical system can be implemented using a distributed computing environment. Cyber-physical systems can refer to systems that include physical entities and mechanisms that are controlled and monitored by computer-based processes. FIG. 2 illustrates an exemplary cyber-physical system that can utilize a distributed computing architecture according to examples of the disclosure. The system 200 described with respect to FIG. 2 can be implemented in an elevator system that transports people and/or objects from one floor of a building to another floor of a building. The system 200 can include a plurality of components 202, 204, 206, 208, 210, 212, and 214 that can be used by the elevator system to facilitate the transport of individuals from one floor of a building to another.

Button controller 202 can represent the processor and memory associated with the buttons of the elevator that are manipulated by a user of the elevator to control which floor/floors the elevator goes to. Elevator controller 204 can represent the processor and memory that can act as the central computing element of the system 200 that can coordinate the activities of each of the other elements attached to it. For instance, elevator controller 204 can be communicatively coupled to hydraulics controller 206 that coordinates the hydraulic components of the elevator system, the car controller 208 that controls the elevator car, and door processors 210, 212, 214, and 216, which control the individual doors of each floor of the building (in this example, the building has four floors).

Similar to the system described with respect to FIG. 1, the individual components of the system 200 can coordinate their activities with respect to executing a distributed software program by passing messages to one another via communications channels 218a-g. The distributed software program being executed by the system 200 can be configured to allow each of the individual components of the system to work together to execute on the common goal of facilitation the operation of the elevator for ordinary use.

The system 200 can act as an example of a cyber-physical system that utilizes a distributed computing architecture. When a software developer is developing distributed software such as the one used to operate the system 200, any errors in the code used to execute the system may be difficult to diagnose and remedy because the code used to implement the system may reside on multiple components of the system. In the example of the system 200, if the elevator is not operating correctly due to a bug in the software used to run the system, a developer may encounter difficulty in locating where the bug is in the code because portions of the code reside on different devices.

In light of this difficulty, software developers have often turned to replay debuggers to aid in the process of diagnosing and fixing errors in the software that are encountered during the development process. As the name implies, replay debugging can involve the execution of a software program that is "recorded" and then played back in a controlled manner to allow a software developer to step through the execution of a software program to pinpoint errors in execution. In the context of a distributed computing system that can execute a distributed software program, a replay debugger can utilize the messages that are generated by components of the distributed system and passed between them to aid the developer in diagnosing errors in distributed software. A replay debugger can operate by collecting all of the messages generated during the operation of a distributed software program and presenting them to the developer so that the developer can sort through them to determine the root cause of an error.

However, the process of sorting through messages generated during the execution of a distributed software program can be cumbersome since many systems that employ a distributed computing environment can produce copious amounts of messages that are often not presented to the user in an organized manner that is meaningful to the developer. The process of sifting through the messages passed between components in a distributed system can be cumbersome and inefficient. Oftentimes, the user of a replay debugger does not want to inspect each and every message associated with the execution of the distributed software but would rather see a subset of those messages, wherein the subset is defined by the user's own constraints.

Furthermore, due to the large number of messages that can be generated during the execution of a distributed software program, simply providing messages for a user to inspect during the debugging process may not be meaningful if the user does not have a method to visualize the chronology and generation of the messages over time and ascertain how various values associated with the execution of the program change over time.

Figure 3:
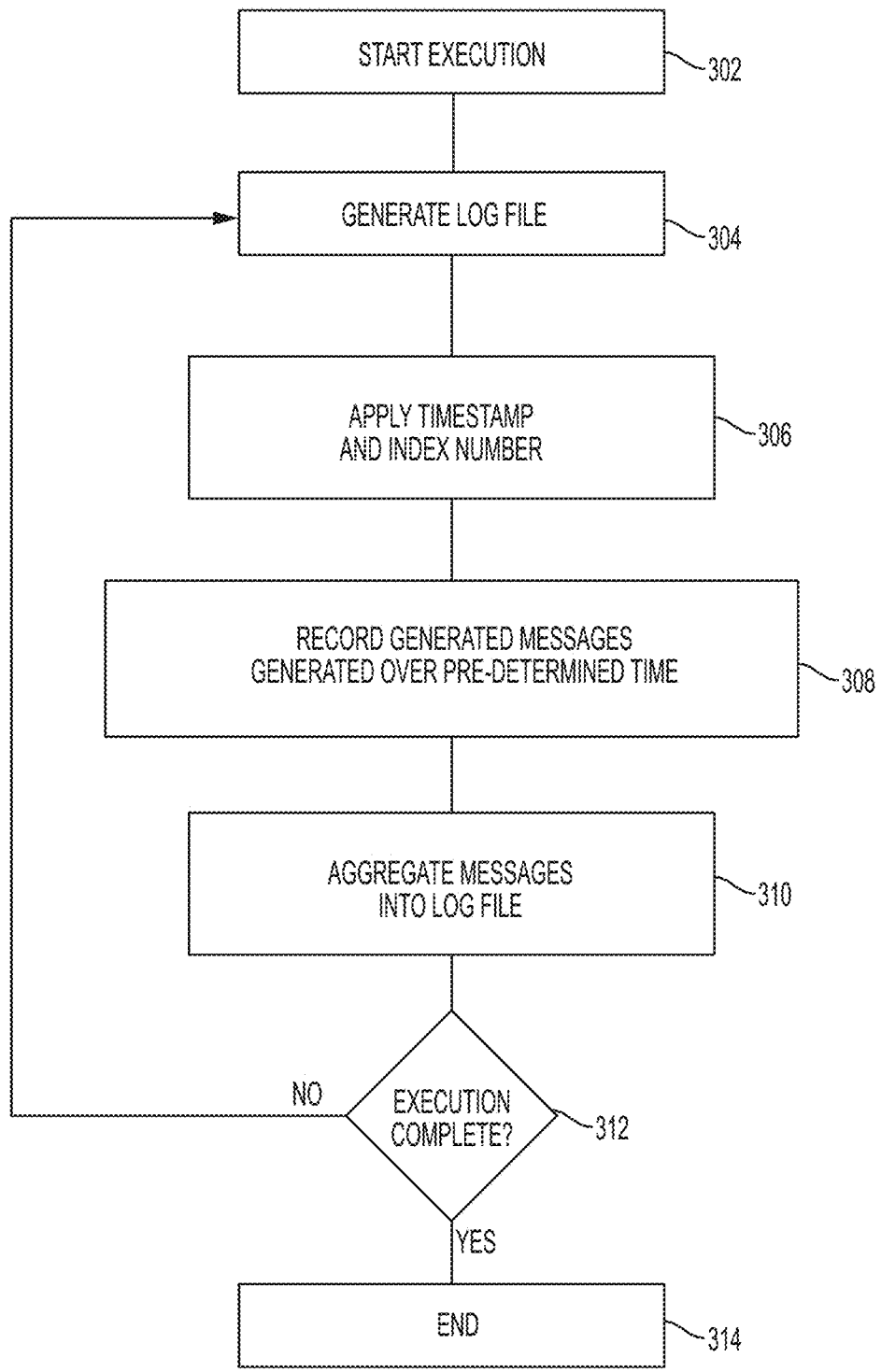
FIG. 3 illustrates an exemplary process for collecting and aggregating messages associated with the execution of a distributed software program according to examples of the disclosure.

A graphical user interface that can be configured to allow the user to constrain the messages used for debugging and present the messages to the user in a format and visual presentation that can facilitate efficient debugging can greatly reduce the amount of time required to engage in the replay debugging of a distributed software program. FIG. 3 illustrates an exemplary process for collecting and aggregating messages associated with the execution of a distributed software program according to examples of the disclosure.

In order to configure a graphical user interface to operate with the above described features, the data generated from the messages during execution of the distributed software program can be collected and organized so as to facilitate the user of the replay debugger's interacting with the graphical user interface.

FIG. 3 illustrates an exemplary process for collecting and aggregating messages associated with the execution of a distributed software program according to examples of the disclosure. The process 300 can be configured to organize the messages generated during execution of a distributed software program into a plurality of logs that are organized in a manner that facilitates operation of a graphical user interface that can make the replay debugging process more efficient.

The process 300 can begin at step 302, wherein execution of a distributed software program is started. As discussed above, a distributed software program can be executed over multiple computing elements. In one or more examples, at step 302, a portion of the distributed software program can be executed according to a user's specification. Using the example of the elevator provided above, the distributed software program associated with operation of the elevator system and its components can be operated beginning with a specific operation such as a user calling the elevator. In other words, step 302 can represent the beginning of a simulation that tests the operation of the distributed software program used to run the elevator.

Once the execution of the software or simulation is started at step 302, the process 300 can move to step 304, wherein a log file is initially created. As will be described further below, a log file can be ingested by the graphical user interface of the replay debugger and used to provide information to the user of the replay debugger about the messages generated during the operation of the software.

Once the initial log file is created at step 304, the process 300 can move to step 306, wherein a timestamp and an index number can be written into the log file. Since the execution of a distributed software program can be spread over multiple separate computing elements, there generally is not a master clock or common clock between the components that can be utilized as a frame of reference to understand the time relationships between various messages passed between components of the distributed computing system. Thus, at step 306, once a log file has been generated by the replay debugger, the generated log file can have a timestamp written into the file by the replay debugger. In one example, the replay debugger can establish time zero to be at step 302, wherein execution of the distributed software program under inspection is begun, and can stamp the log file generated at step 304 with the time that has elapsed since the execution of step 302. For example, if 20 seconds has passed since step 302 was executed and the log file was created at step 304, the replay debugger can write simulation time=20 seconds within the generated log file.

In addition to writing a time stamp at 306, the replay debugger can also write an index number to the generated log file. The rate at which messages are generated during the execution of a distributed software program may exceed the resolution of the simulation time clock. For instance, if the simulation time is kept at a resolution of one second, but multiple log files are generated during that one second (i.e., for instance, if log files are generated every millisecond), then the index number can be used by the replay debugger to keep track of the chronological order of the log files within a given time frame. For instance, if 74 different log files are generated during the 20th second of the software execution, then each of the log files can be written with an index number one through seventy four indicating the order in which the logs were generated during the 20th second. In one more examples, the generated log file can have a timestamp written to it as described above, have an index number written to it as described above, or both.

Once the timestamp and/or index number has been written to the generated log file at step 306, the process 300 can move to step 308, wherein messages generated over a pre-determined time are recorded. As described above, during operation of a distributed software program, a plurality of message can be generated by each of the components of the distributed computing system and transmitted to other components with the distributed computing system. At step 308, the messages generated during the execution of the distributed computing system can be recorded, i.e., stored in a memory. The messages can be recorded over a pre-determined amount of time as set by a user or by the default specifications of the code used to operate the replay debugger. In one or more examples, the user of the replay debugger can manually constrain which messages they wish to be recorded. For instance, in a multi-component distributed computing system, the user of the replay debugger may desire to only review the messages associated with a subset of the components in the distributed computing system. Thus, in one or more examples, the user of the replay can be provided with a graphical user interface that can allow for them to manually select which components of the distributed system should have their messages recorded during step 308.

Once the messages have been recorded at step 308, the process 300 can move to step 310, wherein the messages are aggregated and written into the log file. Aggregation can refer to the process of organizing the generated messages into a single log file or, in some examples, can also refer to the process of combining multiple log files into a single file that can be ingested by the replay debugger.

Once the recorded messages have been aggregated and written into the generated log file at step 310, the process 300 can move to step 312, wherein the replay debugger can check to see if execution of the simulation has been completed. Completion of the execution of the simulation can either occur when a pre-determined amount of time has expired since the execution was started at step 302 or, in some examples, can end when the end of the program itself is encountered during execution. If the execution of the simulation is determined to have been completed, the process can move to step 314, wherein the process 300 is terminated. In one or more examples, terminating the process at 314 can include storing the generated log files in memory and uploading them to the computer or computing resources on which the replay debugger resides. If execution is still on-going, the process 300 can move back to step 304, wherein a new log file is generated and the process starts over.

Upon the completion of the process 300, the replay debugger can now have one or more log files associated with the execution of the distributed software program under inspection that provides information to the user regarding the messages generated during execution of the program. The information can be organized to facilitate operation of the graphical user interface (described below). In one or more examples, after the completion of process 300, the multiple log files generated can be aggregated into a single log file that can be used by the graphical user interface to provide a visual representation of the execution of the distributed software program to the user.

Figure 4:
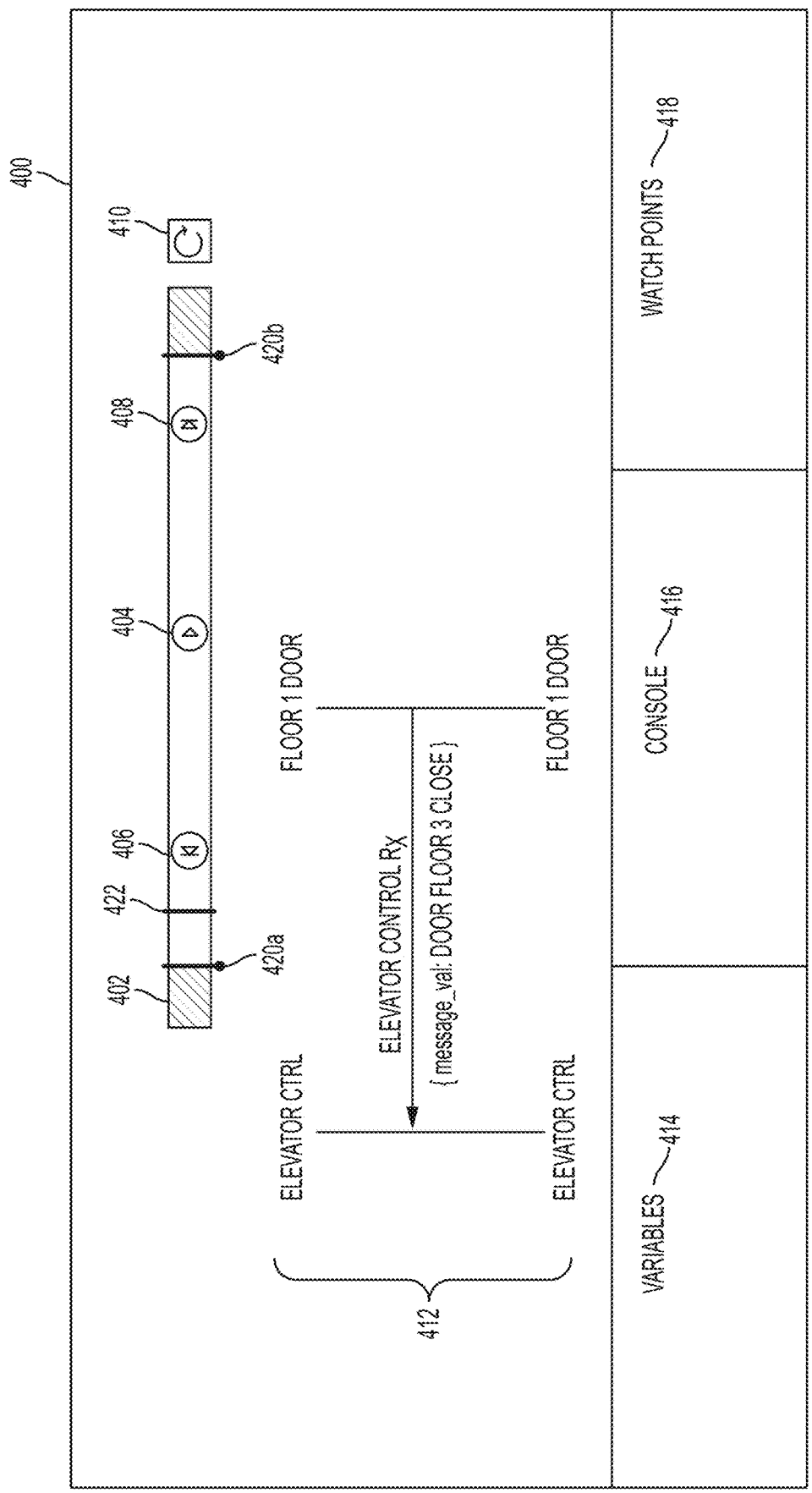
FIG. 4 illustrates an exemplary graphical user interface for a replay debugger according to examples of the disclosure.

FIG. 4 illustrates an exemplary graphical user interface for a replay debugger according to examples of the disclosure. The graphical user interface can be part of a replay debugging software suite that can be made available to a software developer. The replay debugger can be accessed via a cloud server in one or more examples, or it can be stored locally on the machine of the software developer. In one or more examples, putting the replay debugger in a cloud server can facilitate multiple people sharing their logs and files generated during the execution of a particular portion of distributed software and can facilitate collaboration between multiple developers. In the example of a cloud-based system in which multiple users are able to access a common replay debugger, the replay debugger can be configured with a log-in system to verify the credentials of an individual seeking access to the replay debugger. The log-in system can also be used to identify which user has uploaded a log file to the system and can be used to identify which individual account each log file stored in the system belongs to.

As described above, the graphical user interface can be configured to provide the user a way to visualize the progress of the execution of a distributed software program using log files generated by the process described by the discussion with respect to FIG. 3. The log files can be either manually uploaded to the replay debugging tool or in one or more embodiments can be generated by the replay debugging tool when the tool is operating in a real-time mode (discussed further below).

The graphical user interface 400 can include a visual progress bar 402 that can support visualizing progress of the replay debugging process by a user of the replay debugger. The visual progress bar 402 can represent a timeline that can be manipulated by the user. The left side of the progress bar 402 can represent the beginning (in time) of the log file, and the right side of the progress bar 402 can represent the end (in time) of the log file.

Graphical user interface 400 can also include a visual representation of the messages being generated at a specific time by the components within a distributed system as represented within the log file. The visual representation 412 can illustrate the exact messages that are being sent at a particular moment in time correlated with the progress bar 402. Thus, if user clicks on the beginning of the visual progress bar 402, the log entries associated with the beginning of the visual progress bar 402 visual representation 412 can illustrate the messages generated at the beginning of the recording period. If the user clicks on the end of visual progress bar 402, the log entries associated with the end of the recording period can be illustrated at visual representation 412.

Visual representation 412 can illustrate the log entries by illustrating where the message originated (i.e., which computing element sent the message), where the message was sent, and what can visually represent the contents of those messages. Using the example of the elevator provided in FIG. 2, and as illustrated in FIG. 4, at the instance of time shown (i.e., simulation time=20 seconds), visual representation 412 can illustrate that the elevator controller element received a message from the 1st floor door component. Also as illustrated in FIG. 4, visual representation 412 can include information about the contents of the message. In the example illustrated, visual representation 412 shows that the elevator controller received from the 1st floor door a message indicating that the 3rd floor door was closed.

The progress bar 402 can include a play button 404. The play button 404 can allow the user of the replay debugger to allow the recording to play and can also allow the replay debugger to pause the recording. When the recording (i.e., the log file) is allowed to play, visual representation 412 can dynamically change to match the status of the message occurring at the precise time in the play back of the logs. Thus, as the log file is being played back by the play button 404, the visual representation is changing based on the messages appearing in the log file at a given time.

The visual progress bar 402 can also include a progress indicator 422. Progress indicator 422 can provide a visual representation to the user of the graphical user interface 400 of point in time of the execution of the distributed software that is currently being displayed on the screen. In one or more examples, the further right along the visual progress bar 402 that progress indicator 422 is located, the further in time the replay has progressed.

The visual progress bar 402 can also include a step forward button 408. The step forward button 408 can allow the user of the replay debugging tool to "step through" the log file playback one log file at a time. Thus, when the step forward button 408 is pressed by the user (via a mouse click in one example) the playback can advance to the next log file in time. Upon pressing the step forward button 408, the visual representation 412 can change to match the messages associated with the next log file in time.

The visual progress bar 402 can also include, in one or more examples, a step back button 406. The step back button 406 can allow the user of the replay debugging tool to "step back" through the log file playback one log file at a time. Thus, when the step back button 406 is pressed by the user (via a mouse click in one example), the playback can go back to the previous log in time. Upon pressing the step back button 406, the visual representation 412 can change to match the messages associated with the previous log file in time.

The graphical user interface 400 can include sliders 420*a* and 420*b*. Sliders 420*a* and 420*b* can be used by a user to limit the scope of the replay, so that, rather than replaying the entire execution of the distributed software program, the user can instead choose to only replay a portion of the execution. In one or more examples, a user of the graphical user interface 400 can click on slider 420*a* and 420*b* and slide and place them along the visual progress bar 402. As an example, slider 420*a* can be used by the user of the graphical user interface 400 to indicate their preference of where the replay should begin. In one example, if the slider 420*a* is placed at the very left end of the visual progress bar 402, then the replay can begin at the very beginning of the execution of the distributed software program. However, if the slider 420*a* is placed further to the right along the visual progress bar 402, the replay can begin at a time later than the beginning of the execution. For example, the further right the slider 402*a* is placed along the visual progress bar 402, the later the replay of the distributed software program can begin. In other words, the position of slider 420*a* can be proportional to the point in time at which the replay of the distributed software program is to be started.

Slider 420*b* can be used by the user of the graphical user interface 400 to indicate their preference of where the replay should end. In one example, if the slider 420*b* is placed at the very right end of the visual progress bar 402, then the replay can end at the very end of the execution of the distributed software program. However, if the slider 420*b* is placed further to the left along the visual progress bar 402, the replay can terminate at a time earlier than the end of the execution of the distributed software program. For example, the further left the slider 402*b* is placed along the visual progress bar 402, the earlier the replay of the distributed software program can terminate. In other words, the position of slider 420*b* can be proportional to the point in time at which the replay of the distributed software program is to be terminated.

The graphical user interface 400 can also include a replay button 410. Replay button 410, when clicked by the user, can automatically begin the replay of the distributed software program at the point in time indicated by the position of slider 420*a* (i.e., the beginning of the time period). In the example where slider 420*a* is to the far left end of the visual progress bar 402, if replay button 410 is clicked, the replay can start over at the beginning of the execution of the distributed software program. In the example where slider 420*a* is positioned at a point within the visual progress bar 402, when the user clicks on replay button 410, the replay can begin at the point in time of the replay indicated by slider 420*a*.

Also, as illustrated in FIG. 4, the graphical user interface 400 can also include a variables section 414, a console section 416, and a watch points section interface 418. The variables section 414 (described in further detail below) can indicate the status of various variables contained with the messages that make up the individual log files. The console section 416 can provide a space for a user to input various commands to the replay debugger tool. Watch point section interface 418 can allow the user to visualize various watch points that have been inserted into the playback of the log files (discussed in further detail below).

Figure 5:
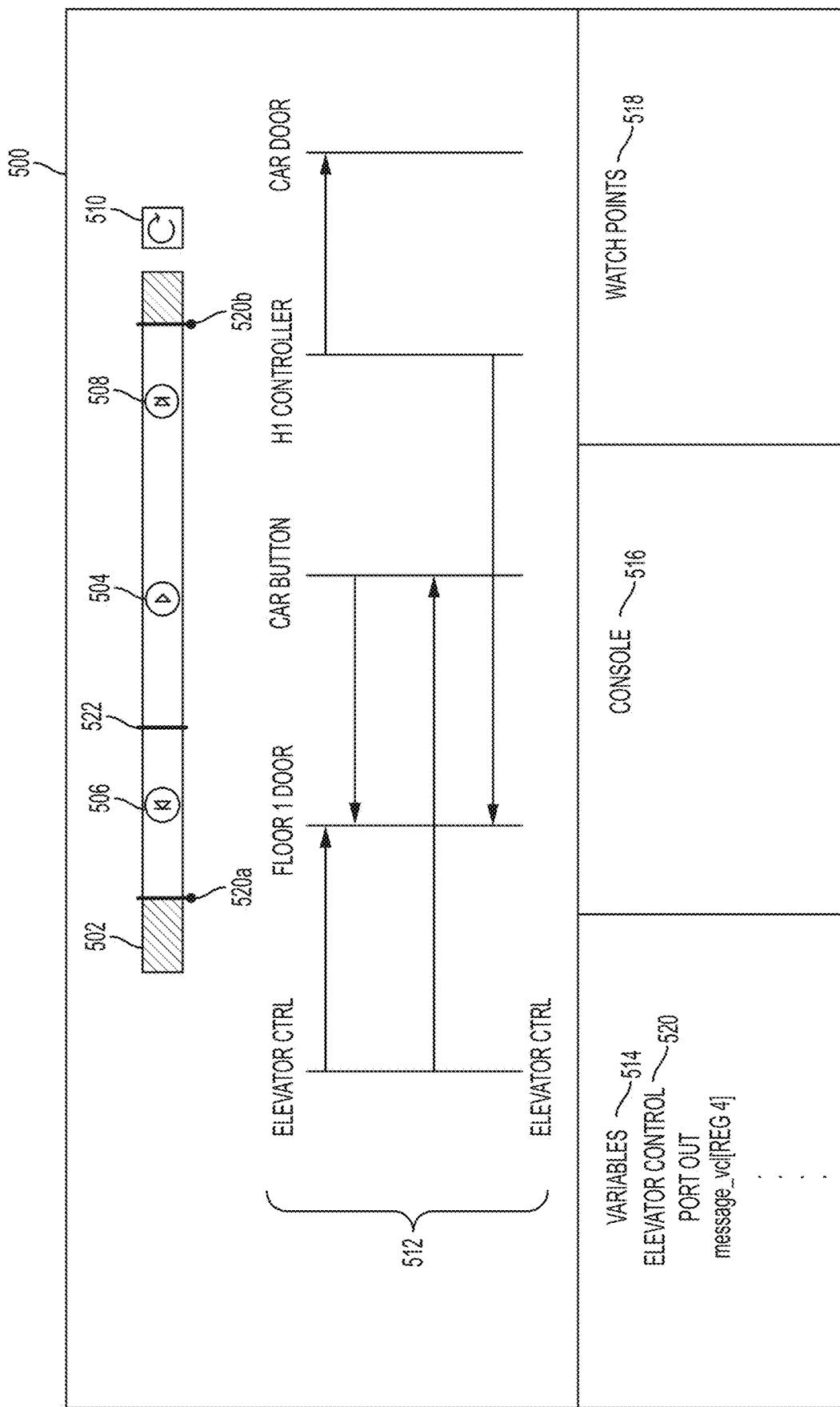
FIG. 5 illustrates an exemplary operation of the variables visualization portion of the replay debugger graphical user interface according to examples of the disclosure.

FIG. 5 illustrates an exemplary operation of the variables visualization portion of the replay debugger graphical user interface according to examples of the disclosure. The graphical user interface 500 of the example of FIG. 5 can operate in substantially the same manner as the example described with respect to FIG. 4. Therefore, for a detailed discussion of the components of the graphical user interface 500 (i.e., elements 502, 504, 506, 508, 510, 512, 514, 516, and 518), the discussion of their counterparts from FIG. 4 (i.e., elements 402, 404, 406, 408, 410, 412, 414, 416, and interface) can be referenced.

The example of FIG. 5 illustrates the operation of the variables section 514. The variables section 514 can illustrate the state of the variables at each moment of time during the playback of the log file. In other words, variables section 514 can provide a summary of the status of the various variables being sent back and forth between the components of the distributed computing system. In the example of FIG. 5, variables section 514 is illustrated as showing that, at the particular moment in the playback, the elevator control is transmitting from the out port and has received message "Reg 4." The variables section 514 can list each and every component visualized in visualization section 512 as well as the variables passed in the messages between the components.

In one or more examples, one or more components listed in the variables section 514 can be labeled with a dot 520. The dot 520 can indicate that the component experienced a change to one or more variables as a result of a message passed to the component during the particular moment in the log playback being visualized. This feature can be utilized as part of the debugging process. As an example, if the distributed software program under inspection exhibits a bug or crashes at a particular moment during the playback of the log files, the variables section 514 can be inspected to see which variables changed in that moment of time, and thus the variables section 514 can be used to help a software developer ascertain the source of a failure of glitch.

In another example, the variables section 514 can be used to detect the presence of malicious users or activity during the operation of the distributed software program under inspection. As an example, if an unexplained change in the variable occurs as indicated by the variables section 514, then the software developer can be alerted to the possibility that the variable change was caused by an unauthorized and/or malicious user who is manipulating the messages between the individual components of the distributed computing system that is executing the distributed software program under inspection. In this way, while the visualization section 512 allows a user to see the activity occurring between components, the variables section 514 can allow the user of the replay debugger to visualize the substantive changes to variables occurring during the visualized activity.

Returning to the example of FIG. 4, the graphical user interface 400 can include a watch points interface. A "watch point" can refer to a programmatic constraint, wherein the replay debugger analyzes the one or more log files associated with a distributed software program to determine if a pre-defined condition is true.

Figure 6:
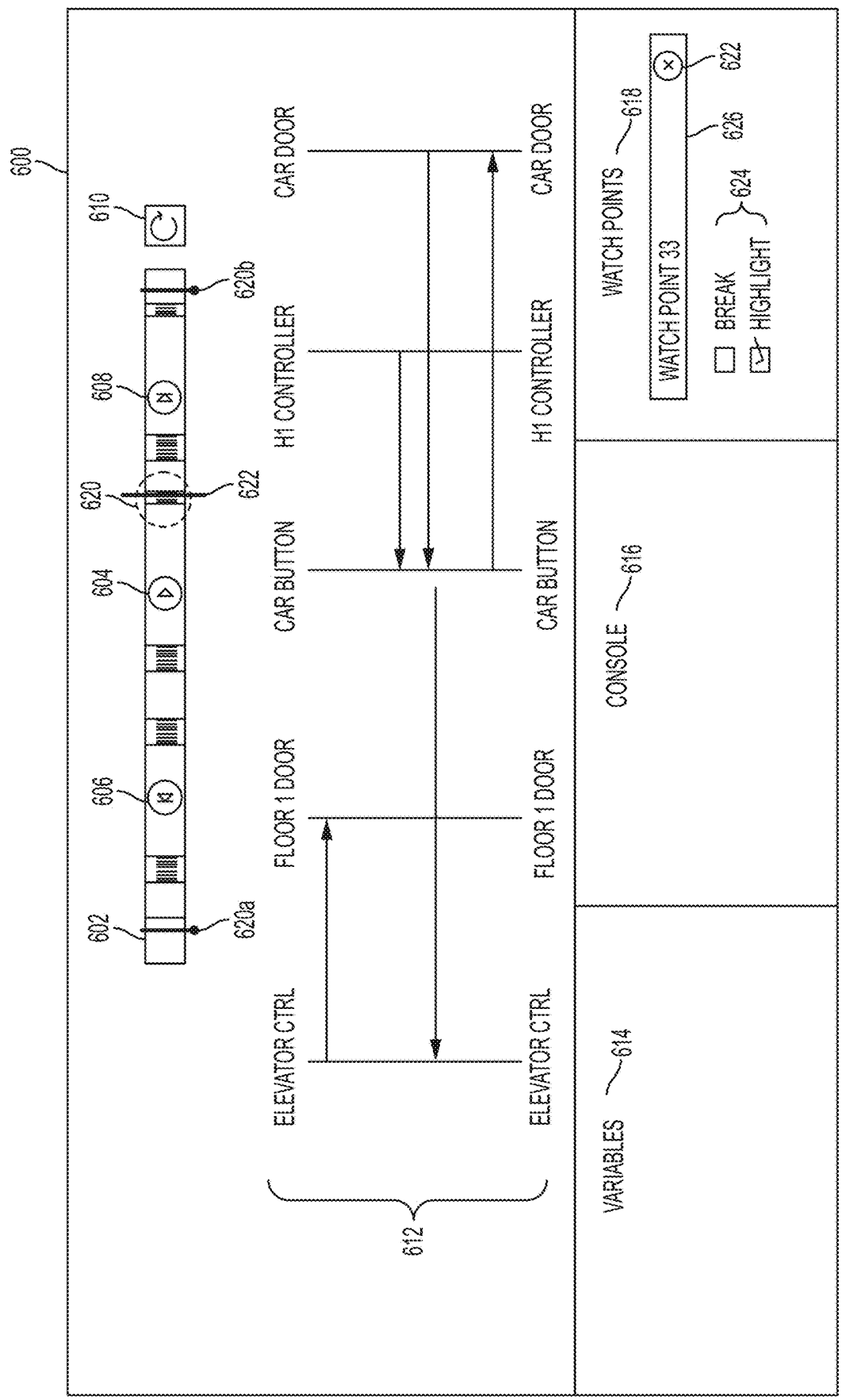
FIG. 6 illustrates an exemplary replay debugger graphical user interface with watch point detection capability according to examples of the disclosure.

FIG. 6 illustrates an exemplary replay debugger graphical user interface with watch point detection capability according to examples of the disclosure. The graphical user interface 600 of the example of FIG. 6 can operate in substantially the same manner as the example described with respect to FIG. 4. Therefore, for a detailed discussion of the components of the graphical user interface 600 (i.e., elements 602, 604, 606, 608, 610, 612, 614, 616, and 618) the discussion of their counterparts from FIG. 4 (i.e., elements 402, 404, 406, 408, 410, 412, 414, 416, and interface) can be referenced.

In the example of FIG. 6, a user of the replay debugger can create and apply one or more watch points to the play back of the log files associated with execution of a distributed software program. As described above, a watch point can refer to a programmatic condition that the replay debugger can search for in a log file. A user can set up the watch point, and the replay debugger can scan the log file or files associated with the distributed software program under inspection to determine when the programmatic condition set by the user is true.

As an example, the user may want to know when a particular variable associated with the log file is greater or less than a pre-defined value. In another example, the user may want to know when one variable associated with the log file is greater or less than another variable associated with the log file. In any of the above examples, the user can user a graphical user interface (not pictured) to create their desired watch points.

Watch points interface 618 can provide a graphical user interface within the graphical user interface 600 to manage watch points created by the user. As illustrated, each watch point created by the user can be identified with a tag 626 that can identify the watch point's name (in the example, the watch point is titled "Watch point 33"). In one or more examples, the tag 626 can include an icon 622 that, when manipulated by the user (i.e., clicked on via mouse as an example), can delete the watch point.

In this way, watch points interface 618 can provide the user of a replay debugger a convenient and efficient means to manage all of the watch points that have been programmed into the play back of the distributed software program under inspection by the replay debugger.

In one or more examples of the disclosure, each tag 626 can include a menu 624 that provides users with additional options with respect to the watch point associated with the tag 626. In one example, and as depicted in FIG. 6, the menu 624 can provide the user the option of whether they want to highlight when the watch point is true on the visual progress bar 602 or provide a break to the replay when the watch point is true.

When the highlight option of menu 624 is selected by the user, the replay debugger can highlight the portions in time in which the watch point condition is true on the visual progress bar 602. As illustrated in the example of FIG. 6, the visual progress bar 602 includes multiple highlighted portions 620. In one or more examples, the highlighted portions 620 can represent time periods during the replay of the log file in which the condition corresponding to the watch point is true.

When the break option of menu 624 is selected, the replay debugger can automatically break (i.e., stop the replay of the log file) when the condition set by the watch point is true. For instance, if a watch point is set to trigger when a variable is above a pre-determined value, when the log file is played (by engaging play button 604), the replay will continuously play until the moment the watch point becomes true. At the moment when the watch point condition becomes true, the replay can "break," meaning temporarily pause, until the user hits play again. In this way, the user can analyze the state of the log file at the precise moment or moments when the pre-defined condition of watch point occurs.

In one or more examples, the replay debugger can also include a real-time playback capability. As described with respect to FIG. 2, in one or more examples, the distributed software program under inspection can be first executed and then have the generated log files aggregated, which can be then uploaded to the replay debugger. In one or more examples of the disclosure, the user can operate the graphical user interface 400 in a real-time mode. When the graphical user interface 400 is operated in real-time mode, once the user pushes the play button 404, the distributed software program under inspection is executed and the log files generated are shown in real-time (i.e., as they are being generated). If the user pauses the replay or goes back, then the replay debugger can revert to its "replay mode," in which the log files displayed in the graphical user interface are shown after they have been generated.

The graphical user interface described above with respect to FIGS. 4, 5, and 6 can facilitate efficient replay debugging by providing the user a convenient and intuitive way to visualize what the distributed software program under inspection is doing at any given time during its operation.

As discussed above, in order to debug a distributed software program, a replay debugger can use the message logs generated by the various components of a distributed computing system to diagnose issues that exist within the distributed software program. Since oftentimes, in the context of a distributed software program, a user may not have access to the entirety of the code (as it is often stored in the individual memories of the components of the system), the user can use the messages passed between the components to diagnose any issues. Thus, with respect to watch points, if the user wants to determine if and when any specified condition occurs during the execution of a distributed software program, they may want to quickly and efficiently scan the generated message logs to search for specific conditions.

Thus, when a user is specifying a watch point, in essence, they are instructing the system to parse through the various message logs to search for logs in which the condition specified by the user is true. In order to execute such a search, in one or more examples, the system can initiate a pattern search through the plurality of message log files generated during the execution of the distributed software program.

A simple example can illustrated the above concept. If a distributed system only generated four types of messages [m1, m2, m3, and m4] and a user wanted to identify all instances in which m1 came before m2 in any given log, then the user would need to review every single log file (which could be in the thousands or even tens of thousands) and search for instances in the log files in which m1 appears before m2. Such a process could be extremely labor intensive and tenuous and therefore likely not feasible to implement.

As creating watch points can be characterized as an exercise in recognizing specific patterns within text, the systems and methods described herein can utilize specific tools that have been developed for discovering patterns within large volumes of text, such as message logs generated during execution of distributed software program. Such tools, often referred to as string search algorithms or string matching algorithms, can quickly and efficiently analyze large volumes of texts to search for distinct patterns that can be specified by a user. String search algorithms can use a precise syntax to express the precise pattern to be searched within the body of text.

String search algorithms are generally configured to maximize the efficiency of a computing device to search through large volumes of text to search for distinct patterns within the text. A string search algorithm that does not take into account the processing capabilities and methodologies employed by computers can mean that the string search algorithm may not yield a computationally efficient process that can parse through a set of text quickly. In the context of the present Disclosure, and specifically with respect to the replay debugger described above, not only must the string search algorithm be configured to allow for quick processing of texts, but it should also be user-friendly in that a user should be able to use a simple syntax to allow the user to quickly and easily set up a watch point.

Regular expressions are an example of a type of string search algorithm available to search for and identify specific patterns within a large body of text. Regular expressions are a sequence of characters that can define a specific pattern to search for in text. Regular expressions are often times employed in web search engines, word processors, and programming languages to search for specific patterns. Specifically, a regular expression is a string of symbols (also referred to as correlation names or correlation variables) representing the pattern to be matched. A regular expression can be built using one or more symbols to represent characters in the search and one or more operators that specify the type of pattern to search for. Examples of operators include a concatenation operator (e.g., an "AND" operator between symbols in a regular expression may be used to indicate an AND relationship between the symbols), alternation operator (e.g., a vertical bar '|' may separate symbols in a regular expression indicating an OR condition for the symbols), quantifiers, and grouping operators (e.g., indicated by parentheses). Examples of quantifiers include an asterisk '*' that can indicate one or more occurrences of the symbol with which the quantifier is associated, a plus sign '+' that can indicate occurrences of the symbol with which the quantifier is associated, and a question mark '?' that can indicate zero or one occurrences of the symbol with which the quantifier is associated, reluctant quantifiers, as examples.

While regular expressions have proven to be a particularly useful way of specifying patterns to be search within text, it is not specified in a user-friendly manner. Regular expressions often employ convoluted and esoteric symbols and characters that are not easily understood and require a great deal of knowledge to employ. Thus, requiring that a user create a watch point by specifying a regular expression may make it more likely that the user is unable to generate a watch point or will generate a watch point riddled with syntax errors, thereby making the watch point unable to be implemented.

To illustrate the nature of regular expressions, an example is provided below. Assume that a definition file for a distributed software program includes messages m1, m2, m3, and m4. If a user, using regular expressions, desired to search a body of log messages to determine instances in which m1 occurs before m2, the regular expression for such a pattern may look like the following:

(m1\[([^\]]+),([^\]]+),([^\]]+)\]) ((?>m1|m3|m4|)\[([^\]]+),([^\]]+),([^\]]+)\])*?(m2\[([^\]]+),([^\]]+),([^\]]+)\])

While the above regular expression is formatted and specified in a manner that can make the processing of such request faster and more computationally efficient, requiring a user to enter such an esoteric and complex search declaration will likely lead to a poor user experience and the inability to efficiently and effectively establish watch points.

Thus, in order to allow a user to specify their search criteria in a more user-friendly and simplistic manner, an "intermediate" or domain-specific language can be used that allows a user to specify a search in a simplistic manner. The user's specification can then be converted into a regular expression, which can then be executed by on a plurality of message logs to identify patterns that match the user's specification.

An example domain-specific/intermediate language is described below. For purposes of the discussion, the example provided below can be called Happened-Before Language (HBL) and can represent a domain specific language that can be employed by a user of a replay debugger to specify watch points. The HBL language can be used to analyze log files. To illustrate the functionality of the HBL language, assume a distributed software program in which there are only four types of message types: m1, m2, m3, and m4. Also assume that each message type m1, m2, m3, and m4 can be sent to and from components with the example distributed system labeled c1, c2, c3, and c4. Thus, in an example, a log string and expression such as m1[c1,c3] in the HBL language can represent message type m1 being sent from component c1 to component c3.

Given the specification of HBL described above, a log string in a replay debugger can appear as follows:
m1[c1,c3]  m1[c1,c2.c3]  m1[c2,c1]  m1[c3,*]  m4[*,c3] m3[c1,c3]  m1[c1,c2]  m1[c1,c3]  m1[c1,c3]  m2[c2,c1] m1[c3,*] m4[*,c3] m2[c3,c2] m3[c1,c3]

The above string shows various message types (m1-m4) being sent by various components (c1-c4). The HBL can be configured to allow the user to search for various patterns within a set of logs. For instance, a user could enter the following command: m1→m2. The above command can specify that the user is seeking to find all instances in which m1[*,*] happens before m2[*,*]. In other words, m2 must occur and m1 must occur, though in between, any message types other than m2 can occur. If the above HBL specification is executed on the log string provided in the example above, two results (i.e., hits) can occur as indicated below:
1. m1[c1,c3] m1[c1,c2.c3] m1[c2,c1] m1[c3,*] m4[*,c3] m3[c1,c3] m1[c1,c2] m1[c1,c3] m1[c1,c3] m2[c2,c1]
2. m1[c3,*] m4[*,c3] m2[c3,c2]

The above hits indicate patterns in the log string in which m1 appears before m2. The user can not only search for patterns based on message type but can also search for message types sent to or from a specific component within the distributed programming system. For instance, the user can specify the following command using HBL: m1[c3,*]→m2. This command can indicate that the user wishes to search for all instances in a log string in which m1[c3,*] happens before m2[*,*]. In other words, rather than just searching for instances in which message type m1 happens before m2, the search is more specific and is seeking instances in which message type m1 is transmitted from c3 before message type m2 occurs. Using the above log string, such a query can yield the following hits:

1. m1[c3,*] m4[*,c3] m3[c1,c3] m1[c1,c2] m1[c1,c3] m1[c1,c3] m2[c2,c1]
2. m1[c3,*] m4[*,c3] m2[c3,c2]

In one or more examples, the user using HBL can specify specific chronological patterns of message types. In other words, rather than just specifying patterns in which m1 occurs before m2, a user can specify to what degree m1 should come before m2. For example, if a user specifies the following HBL command: m1→[2] m2, then the system can search for all instances in a specified log string in which m1[*,*] happens exactly two messages before m2[*,*]. In other words, m2 must occur, and any two message types can occur, and then m1 must occur. Using the log string example above, the following hit can be produced:

1. m1[c1,c2] m1[c1,c3] m1[c1,c3] m2[c2,c1]

In another example, the HBL language can also be configured to allow the user to specify negative conditions. For instance, a user can set up a watch point by issuing the following command: m→!m2. This command can indicate that the user wishes to search for all instances in a log string in which m1[*,*] happens before m1, m3, or m4. Alternatively stated, m1, m3, or m4, but not m2, occurs after m1. A substring of the log string that starts with m1 and ends with anything but m2 is a match. This substring will not include the ending message type of "anything but m2." Note that there could be more than two message types in matches. Using the log string example from above, the above command can produce the following hits:

1. m1[c1,c3] m1[c1,c2.c3]
2. m1[c1,c2] m1[c1,c3]
3. m1[c3,*] m4[*,c3]

In one or more examples, the HBL language can employ variable expressions. In one or more examples, variable expressions can be constructed with variables using the following operators: NOT (!), AND (&&), OR (H), ==, <, >. Therefore, a variable expression is an assertion that can evaluate to a boolean value. In one or more examples, a variable expression can be used to identify events in which a variable is of a certain value or range of values. Variable expressions can be evaluated on every log file, or in one or more examples can be evaluated in log files containing certain types of messages. For example, a variable expression that is combined with a → expression, can indicated that the variable expression is only to be evaluated on specific messages corresponding to a matched substring, and may not be evaluated on other logs. More specifically, when combined with a → relationship, a variable expression may be evaluated based on the semantics of as shown below.

m→((c1.var1==5) && (m2.var3>32.2)) asserts that the variable expression will evaluate to true at some time after m1 occurs.

m1→m2 ((c1.var1==5) && (var3>32.2)) asserts that the variable expression will evaluate to true at some time after m1 occurs. Note that "var3" is unqualified, and therefore is is interpreted as "m2.var3" using the "m2" outside of the parenthesis.

m1→[0] ((c1.var1==5) && (m2.var3>32.2)) asserts that the variable expression will evaluate to true immediately after m1 occurs.

m1→[5] ((c1.var1==5) && (m2.var3>32.2)) asserts that in the $6^{th}$ log message prior to when the expression c1.var1==5) && (m2.var3>32.2)) evaluates to true is of message type m1.

m1→[5] m2→[0] ((c1.var1==5) && (m2.var3>32.2)) asserts that the variable expression will evaluate true immediately after m2 that occurs 5 message types after m1.

The above examples are provided only for purposes of illustration and should not be construed as limiting. Furthermore, the above examples illustrate only a portion of the HBL's capabilities, and the HBL can be configured to allow a user to specify other types of patterns not discussed above.

Referring back to FIG. 6, a user of the graphical user interface 600 can utilize the console 616 to enter a watch point. In the console 616, the user can create a watch point using the HBL language described above, a user can enter a watch point that can be applied against the log files generated during an execution of a distributed software program as described above. The replay debugger can then engage in a process (described in detail below) by which a watch point is created and the log files are scanned to determine if there are any strings within the log files that match the patterns specified by the user through the created watch point.

Figure 7:
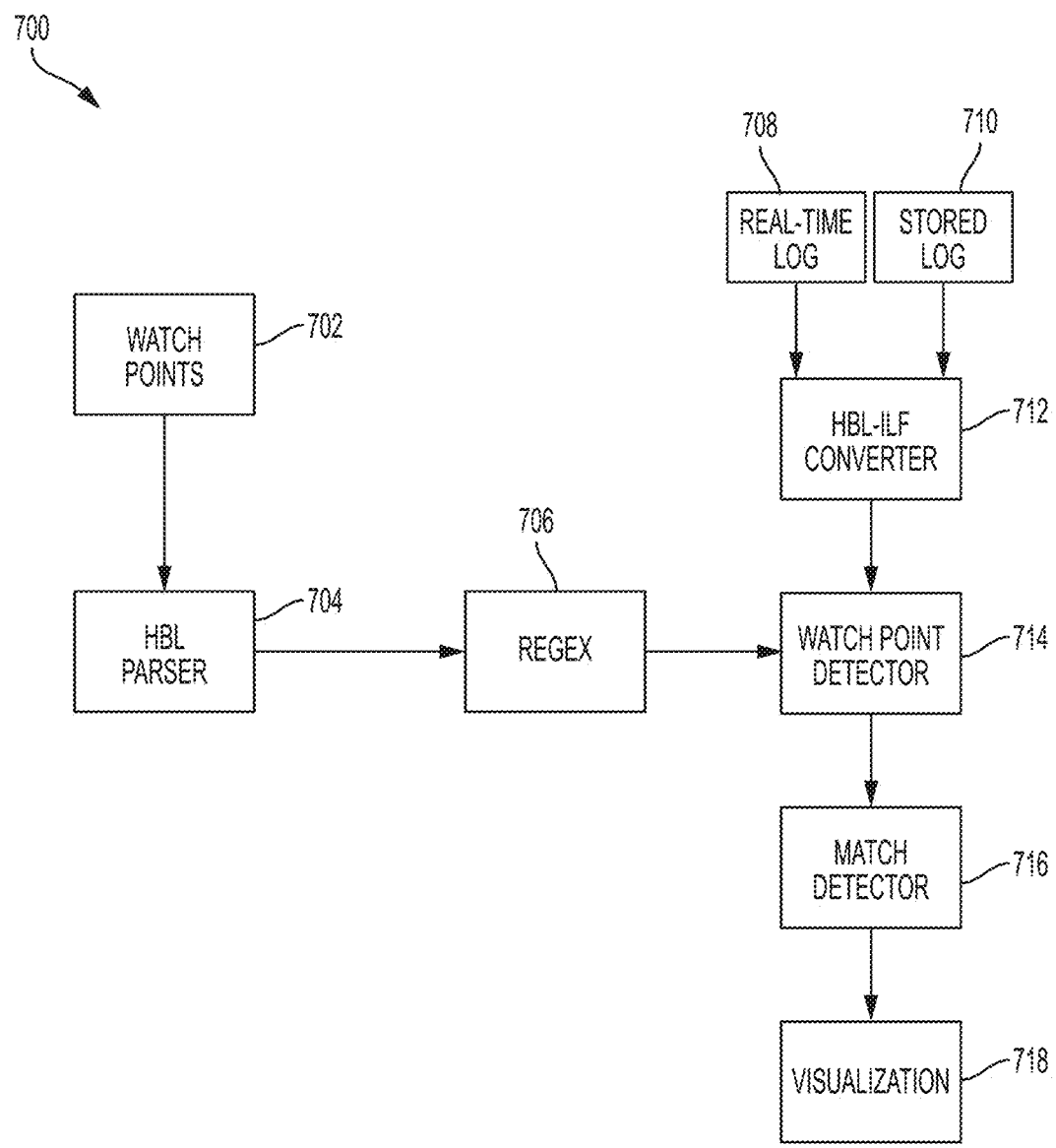
FIG. 7 illustrates an exemplary system for generating a watch point within a replay debugger graphical user interface according to examples of the disclosure.

FIG. 7 illustrates an exemplary watch point creation system according to examples of the disclosure. The system 700 can include one or more watch points 702, which can be generated by a user using a domain-specific language, such as the example of HBL provided above. In one or more examples, the watch points 702 created by one or more users as described above can be stored in a memory (not pictured). In this way, the watch points can be made more easily available to other components of the system 700 for further processing.

The system 700 can also include a parser 704. In the example of the system 700, the parser 704 can be an HBL parser that is specifically configured to work with watch points that are declared by a user using the HBL language as described above. The parser 704 can parse each watch point 702 and determine if the watch point 702 contains one or more syntax errors. The parser 704 can also parse each watch point 702 to determine whether or not the watch point contains an incomplete specification, an inconsistent specification, or an incorrect specification. In other words, the parser 704 can parse each and every watch point 702 to determine if the watch point contains one or more errors that may prevent the system from identifying matching patterns in the log file.

If the parser 704 determines that such an error exists within one or more of the watch points 702, the parser 704 can generate an error message to the user indicating that one or more errors exist in the watch point. Referring back to the example graphical user interface discussed with respect to FIG. 6, in one or more examples, the parser 704 can generate an error message and transmit the error message to console 616 so that the user of the graphical user interface can be alerted that a watch point that they specified contains one or more errors in how it was specified.

Once the parser 704 has parsed each watch point 702 to detect any errors in how the watch point 702 was specified, the watch points 702 can be converted into a regular expression (described above) by a converter 706, which can then be applied to the log files. The converter 706 can employ one or more algorithms that effectively map HBL expressions into regular expressions. The regular expressions generated by the converter 706 can then be applied to the log files (as discussed below).

In parallel to the creation of the watch points 702, and their conversion to regular expressions, the log files generated by execution of a distributed software program can be stored and converted into an intermediate format that can be searched by the regular expressions. Thus, the system 700 can include real-time log generator 708 and stored log generator 710. Real-time log generator 708 can generate log files during the real-time execution of a distributed software program as described above. Likewise, stored log generator 710 can also generate log files based on a prior execution of a distributed software as described above.

Both the real-time log files 708 and the stored log files 710 can be converted into an intermediate log format (ILF) prior by ILF converter 712. In one or more examples, ILF can refer to any custom written mapping software that can convert a raw stream of data to a particular format. Thus, in one or more examples, the systems and methods described herein can be used to detect events in any raw data stream. Since Regex processing can depend on a standardized representation of log files, the ILF converter 712 can convert the log files provided by elements 708 and 710 into a format that is easier and more efficiently searched using the regular expressions generated by converter 706 (i.e., HBL Intermediate Log format). A system may generate HBL ILF format compliant records or logs natively, or alternatively in one more examples the native generated logs can be translated to HBL ILF formatted logs.

The system 700 can also include a watch point detector 714. The watch point detector 714 can take at its inputs the ILFs produced at element 712 and the regular expressions generated by the converter 706. The watch point detector 714 can apply the regular expressions to the ILFs and generate detection triggers and matching log records in the ILF.

Watch point detector 714 can then transmit the matching log records from the ILF and the original real-time logs and stored logs generated by elements 708 and 710 to a match detector 716. The match detector 716 can use the matching log records from the ILF to find the matching log records in the real-time and stored logs.

Once the matching log records are found by the match detector 716, the identified matching logs can be transmitted to a visualization unit 718. Visualization unit 718 can translate the determined matches into visualizations that can be applied to a graphical user interface (such as the example provided in FIG. 6). For instance, visualization unit 718 can generate the display of the watch points in watch point interface 618 and can apply highlights 620 to the visual progress bar 602.

Figure 8:
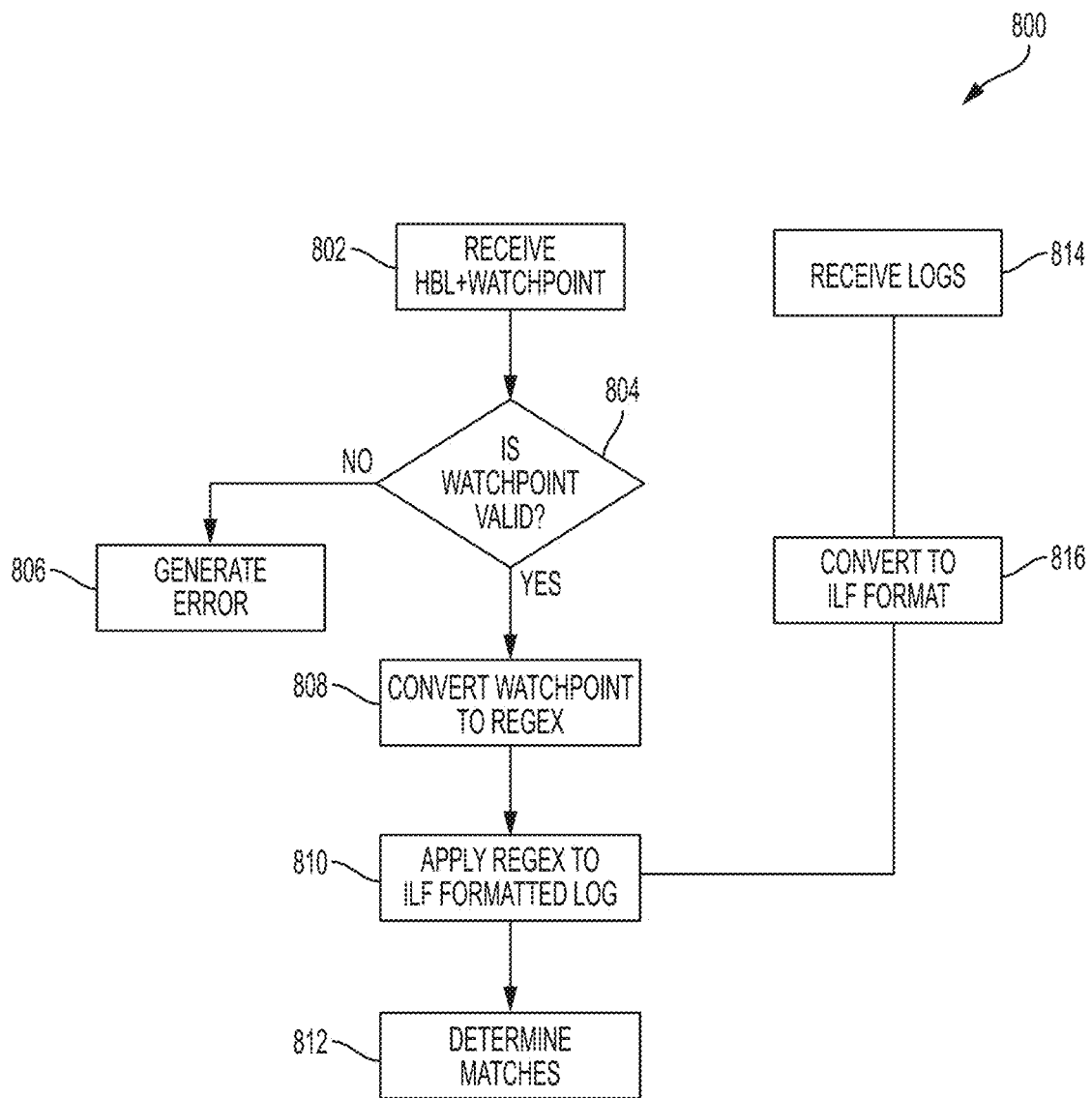
FIG. 8 illustrates an exemplary method for identifying patterns in a plurality of log files of a replay debugger according to examples of the disclosure.

FIG. 8 illustrates an exemplary method for identifying patterns in a plurality of log files of a replay debugger according to examples of the disclosure. The method 800 can be implemented in one or more examples by the system described above with respect to FIG. 7. The method 800 can begin at step 802, wherein one or more watch points are received by a user of a replay debugger. The one or more watch points can be specified using a domain-specific language such as HBL, as described above.

After receiving the watch points at step 802, the process can move to step 804, wherein a determination can be made as to whether the one or more watch points received at step 802 are valid. As described above with respect to FIG. 7, a watch point can be analyzed at step 804 to determine whether the watch point contains any syntax errors, incomplete specification, inconsistent specifications, or incorrect specifications. If it is determined at step 804 that watch points contain one or more errors as described above, the process can move to step 806, wherein the user is alerted to the error in the watch point as described above with respect to FIG. 7.

If however, the watch point is found to not detect any errors at step 804, the process can move to step 808, wherein the watch point is converted from the domain-specific language such as HBL into a regular expression that will be ultimately used to search for matching patterns in the log files.

In parallel to receiving the watch points at step 802, the method 800 can also receive one or more log files at step 814. The log files received at step 814 can be generated from the execution of a distributed software program either in real time or at an earlier time as described above. Once the log files have been received, the method 800 can move to step 816, wherein the log files can be converted into an ILF as described above with respect to FIG. 7.

Once the domain specific language specified watch points have been converted to regular expressions at step 808, and the ILFs have been created at step 816, the process can move to step 810, wherein the regular expressions can be applied to the ILFs. In other words, at step 810, the regular expressions are used to search for matching patterns in the ILFs.

After the regular expressions are used to find corresponding matches in the ILFs at step 810, the process can move to step 812, wherein the matches found in the ILFs are used to determine matches in the corresponding log files received at step 814, as described above with respect to FIG. 7. In other words, the matching patterns found in the ILFs are then identified within the original log files received at step 814. In this way, the patterns in the log files that match the conditions specified by the watch points are identified.

Figure 9:
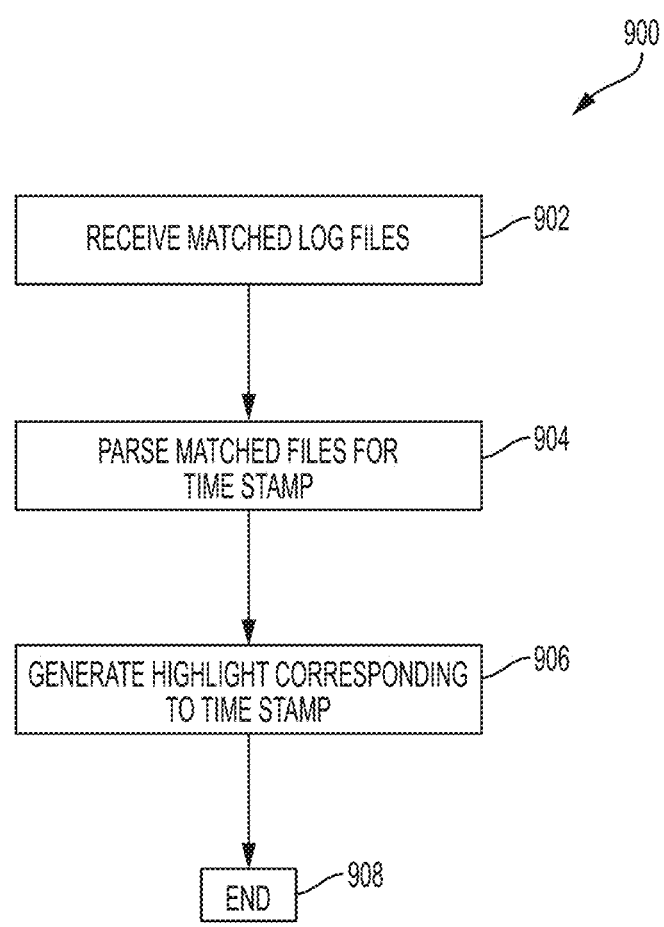
FIG. 9 illustrates an exemplary method for generating a visualization of a watch point within a replay debugger according to examples of the disclosure.

After determining the portions of the log files that match the user specified watch points, the replay debugger described above can provide a visualization of where the matches occurred via the graphical user interface described above with respect to FIG. 6. FIG. 9 illustrates an exemplary method for generating a visualization of a watch point within a replay debugger according to examples of the disclosure. The method 900 can begin at step 902, wherein the log files that match the specified watch points can be received. In one or more examples, the matches received at step 902 can be generated at step 812 as discussed above with respect to FIG. 8.

Once the matching log files have been received, the process can move to step 904, wherein each matching log file can be parsed to extract a time stamp corresponding to the log file. As described above, each log file can include a time stamp that indicates the chronological time during the execution of the distributed software program in which the log file was generated. Thus, at step 904, each log file that includes a pattern that matches the user-specified watch point can be examined to determine at what point in time during execution of the distributed software program the log file was generated.

Based on the extracted time stamps, the process can move to step 906, wherein a highlight or highlights similar to highlight 620 of FIG. 6 is generated on the visual progress bar at a location that correlates with the chronological time stamp extracted at step 904. In this way, the user is alerted to the moments in time during the execution of the distributed software program that the condition that they specified using the watch point occurs. Once the visualization has been provided at step 906, the method 900 can move to step 908, wherein the process is terminated. The conclusion of method 900 thus yields a visual reference on a graphical user interface that can allow the user to visually see the moments during an execution of a distributed software program in which a specified watch point occurs.

The systems and methods described above while providing a robust solution to replay debugging, may not be sufficient in some contexts. For instance, the above systems and methods use log files created during the operation of a distributed software system to perform the analysis. This can mean that the system must wait for the log files to be generated and stored before the system can perform the necessary analysis to detect alert conditions specified by the watch points created by a user. The latency between when a condition in a watch point occurs, and when the log file can be generated, can mean that an error of interest may not be detected until time a significant time has passed since the log file must first be generated before an analysis can occur. Thus in one or more examples, the ability to analyze the actual data stream between nodes in a distributed computing system running a distributed software program can be beneficial, as it allows for near real-time detection of conditions that the user may want to be alerted to.

In the systems and methods described above, in which log files are analyzed, the log files generated by each of the nodes in a distributed system can be transmitted to a central server wherein a replay debugger can use the transmitted log files to perform debugging analysis on the log files. In one or more examples, the log files generated by each node in a distributed computing system can be stored in a database, and the replay debugging analysis can be implemented be having the debugger perform a query against the This process can thus add more latency to the debugging process because not only do the log files have to be generated at each node, but they must also be transmitted to a central server for further processing.

Given the limitations described above, it can be beneficial to analyze the actual data streams being transmitted between nodes in a distributed computing system rather than analyzing the log files of communications between transmitted between nodes. A system and method for analyzing streams of data can present challenges because a centralized architecture in which a central server or processor analyzes all of the communications in a distributed computing network may not lend itself well to a system that analyzes streaming data versus a system that analyzes log files that can represent a summary of the communications between nodes. Thus, in order to implement a debugging system that can analyze streams, the system may need to be decentralized. In other words, the analytics associated with a reply debugger may need to be performed at least in part at the location of the communications, rather than in a centralized location.

Figure 10:
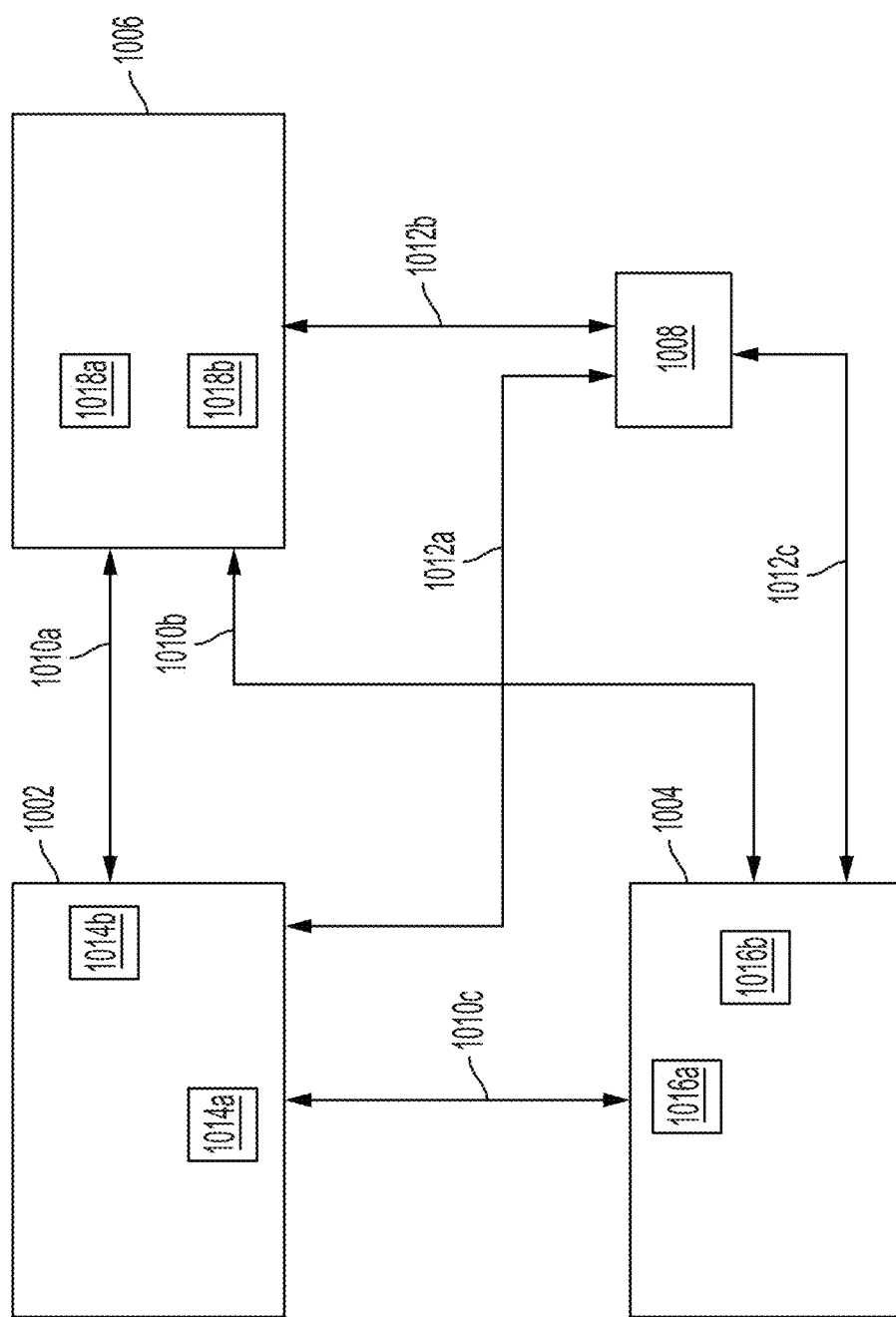
FIG. 10 illustrates an exemplary distributed computing system configured to perform replay debugging on streaming data according to examples of the disclosure.

FIG. 10 illustrates an exemplary distributed computing system configured to perform replay debugging on streaming data according to examples of the disclosure. The example of FIG. 10 illustrates a distributed computing system 1000 similar to the example of FIG. 1 that includes a plurality of computing elements 1002, 1004, and 1006. In one or more examples, and similar to FIG. 1, elements 1002, 1004, and 1006 can be part of a distributed software system in which a single software program is implemented across multiple elements (i.e., "nodes").

In one or more examples, during operation of the distributed software system, elements 1002, 1004, and 1006 can transmit data to one another. Thus in the example of system 1000, element 1002 and element 1004 can communicate data with one another via communications link 1010c. Element 1002 can communicate with element 1006 via communications link 1010a, and element 1006 can communicate with element 100r using communications link 1010b. In one or more examples, communications links 1010a-c can be implemented using conventional wired or wireless communications protocols such as Ethernet, WiFi, Bluetooth, etc.

In one or more examples, the system 1000 can include a central processor 1008 that can be configured to implement a replay debugger that can be used to evaluate system 1000 during operation of the distributed software system. In one or more examples, central processor 1008 can be configured to transmit and receive communications from each of element 1002, 1004, and 1006 via communications links 1012a, 1012b, and 1012c respectively. In one or more examples, and as described in detail below, central processor 1008 can work in conjunction with software elements located at each elements 1002, 1004, and 1006 so as to provide replay debugging capabilities on streaming data between each of the elements in the distributed software system.

As discussed above, a system that is configured to analyze streams of data in real-time rather than analyzing stored log-files can be implemented by distributing some of the analytical functions of a replay debugger to each of the computing devices in a distributed system. Thus in one or more examples, each element 1002, 1004, and 1006 (in addition to including a CPU and memory, not pictured) can include one or more detections engines. As described in further detail below, each of the detections engines implemented on an element of the distributed computing system can be configured to receive streaming data, and perform a preliminary analysis on the streaming data to determine if the streaming data matches or "partially" matches any of the watch points specified by a user.

In one or more examples, a detection engine can be implemented for each and every data stream transmitted by a specific element (i.e., node) of the distributed computing system. For instance, element 1002 can include detections engines 1014a and 1014b. In one or more examples, detection engine 1014a can be configured to implement debugging analysis on the communications to be transmitted to element 1004 via communications link 1010c. Element 1002 can include a detection engine 1014b which can be configured to implement debugging analysis on the communications to be transmitted to element 1006.

With respect to element 1004, the component can also include two detection engine 1016a and 1016b. In one or more examples, detection engine 1016a can be configured to implement debugging analysis on the communications to be transmitted to element 1002 via communications link 1010c. In this way, a separate detection engine can be implemented for both sides a given communications link. In the example of system 1000, detection engine 1014a can be implemented in element 1002 to perform replay debugging analysis on communications emanating from element 1002 to element 1004 via communications link 1010C. Detection engine 1016a can be implemented in element 1004 to perform replay debugging analysis on communications emanating from element 1004 to element 1002. Thus, both sides of a communications link can, in one or more examples, have its own detection engine to monitor a specific stream of communications. Element 1002 can include a detection engine 1014b which can be configured to implement debugging analysis on the communications to be transmitted to element 1006. In one or more examples, Element 1006 can include detections engines 1018a and 1018b. Detection engine 1018*a* can be configured to perform streaming analysis on data transmitted from element 1006 to element 1002 via communication link 1010*a*, while detection engine 1018*b* can be configured to perform analysis on data transmitted from element 1006 to element 1004 via communications link 1010*b*.

In one or more examples, each detection engine 1014*a-b*, 1016*a-b*, and 1018*a-b* can be implemented as a software container which can be spun up or brought down based on one or more conditions of the elements in the distributed computing system 1000. For instance, if a new element is introduced to a distributing system, then a new detection engine implemented in a container can be created so as to capture a data stream a perform debugging analysis on the data stream.

As described above, each of element 1002, 1004, and 1006 can be connected to central processor 1008 via communications link 1012*a-c* respectively. In one or more examples, central processor 1008 can transmit watch points generated by a user to each of the elements 1002, 1004, and 1006 and can also receive watch point matches found at each of the elements as well.

As described above, each detection engine of the system 1000 can be configured to analyze their respective data streams to find matches with one or more watch points specified by a user of the system. Unlike log files, streaming data can be received intermittently and at aperiodic intervals thereby complicating the analysis process. In order to account for this fact, in one or more examples, the detection engines of system 1000 can be configured to "window" the received data, and can also be configured to store matches or partial matches with watch points so as to ensure that matches within a stream aren't discarded.

Figure 11:
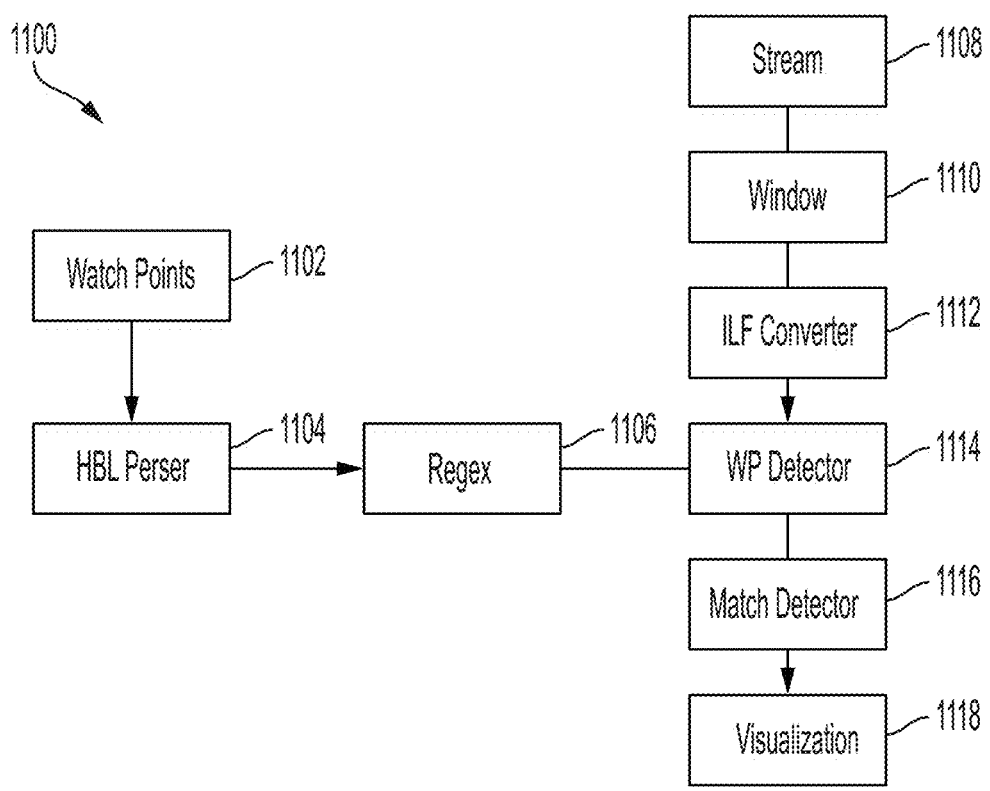
FIG. 11 illustrates an exemplary system for generating a watch point within a replay debugger graphical user interface adapted to monitor streaming data according to examples of the disclosure.

FIG. 11 illustrates an exemplary system for generating a watch point within a replay debugger graphical user interface adapted to monitor streaming data according to examples of the disclosure. The system 1100 can include one or more watch points 1102, which can be generated by a user using a domain-specific language, such as the example of HBL provided above. In one or more examples, the watch points 1102 created by one or more users as described above can be stored in a memory (not pictured). In this way, the watch points can be made more easily available to other components of the system 1100 for further processing. In one or more examples, and referring to the example of FIG. 10, each watch point can be created by a user at central processor 1008, and transmitted to each of the elements in the distributed computing system for processing on each stream by each detection engine within an element.

The system 1100 can also include a parser 1104. In the example of the system 1100, the parser 1104 can be an HBL parser that is specifically configured to work with watch points that are declared by a user using the HBL language as described above. The parser 1104 can parse each watch point 1102 and determine if the watch point 1102 contains one or more syntax errors. The parser 1104 can also parse each watch point 1102 to determine whether or not the watch point contains an incomplete specification, an inconsistent specification, or an incorrect specification. In other words, the parser 1104 can parse each and every watch point 1102 to determine if the watch point contains one or more errors that may prevent the system from identifying matching patterns in the log file.

If the parser 1104 determines that such an error exists within one or more of the watch points 1102, the parser 1104 can generate an error message to the user indicating that one or more errors exist in the watch point. Referring back to the example graphical user interface discussed with respect to FIG. 6, in one or more examples, the parser 1104 can generate an error message and transmit the error message to console 616 so that the user of the graphical user interface can be alerted that a watch point that they specified contains one or more errors in how it was specified.

Once the parser 1104 has parsed each watch point 1102 to detect any errors in how the watch point 1102 was specified, the watch points 1102 can be converted into a regular expression (described above) by a converter 1106, which can then be applied to a data stream which are now in the form of intermediate log files. The converter 1106 can employ one or more algorithms that effectively map HBL expressions into regular expressions. The regular expressions generated by the converter 1106 can then be applied to the log files (as discussed below).

In parallel to the creation of the watch points 1102, and their conversion to regular expressions, the data streams generated by execution of a distributed software program can be stored and converted into an intermediate format that can be searched by the regular expressions. Thus, the system 1100 can include data stream receiver 1108, and data stream window generator 1110. In one or more examples, upon receiving data a data stream 708 the data can be stored in a buffer (i.e., temporary memory such a cache) for further processing. In order to create intermediate log files from the streaming data, the streaming data can be "windowed" meaning that a subset of the data received can be converted into a data set that can later be converted into an intermediate log format. In one or more examples, when data is received at 1108, the system as described above can store the received data in a buffer. The window generator 1110 can process the data in the buffer by selecting data in the buffer corresponding to one or more time windows. In one or more examples, the window generator 1110 can implement a sliding window in which the window can slide such that each window contains overlapping data. In one or more examples, the sliding window can be implemented spatially such that each window includes mutually exclusive data stored within the buffer.

Each window generated by window generator 1110 can be converted into an intermediate log format (ILF) prior by ILF converter 1112. Since Regex processing can depend on a standardized representation of log files, the ILF converter 1112 can convert the streaming data provided elements 1108 and 1110 into a format that is easier and more efficiently searched using the regular expressions generated by converter 1106 (i.e., HBL Intermediate Log format). A system may generate HBL ILF format compliant records or logs natively, or alternatively in one more examples the native generated logs can be translated to HBL ILF formatted logs.

The system 1100 can also include a watch point detector 1114. The watch point detector 1114 can take at its inputs the ILFs produced at element 1112 and the regular expressions generated by the converter 1106. The watch point detector 1114 can apply the regular expressions to the ILFs and generate detection triggers and matching log records in the ILF.

Watch point detector 1114 can then transmit the matching log records from the ILF and the data stream. In one or more examples, match detector 1116 can determine if the one or more intermediate log files generated by converter 1112 includes a match to one or more watch points or may contain one or more partial matches to the watch points specified at watch point detector 1114. In one or more examples, if match detector 1116 detects that the window being analyzed is a complete match to a watch point or regex expression, then in one or more examples, the match detector 1116 can store the window in a memory for further processing, and in one or more examples can instantly alert a user to the match. Additionally, in one or more examples, if the window being analyzed partially matches a watch point or regex expression, then that window can also be stored by the system 1100 in memory. In this way, when subsequent windows are analyzed by match detector 1116, they can not only be analyzed to determine if they contain full or partial matches to the watch points or regex expressions, but they can also be analyzed to determine if they complete previously found "partial matches." A more detailed discussion of the matching process can be found below.

In one or more examples, by discarding data that does not match any of the watch points, the system in general can be required to store less data, and can transmit only the matching data to the central processor for further analysis.

Once the matching log records are found by the match detector 1116, the identified matching logs can be transmitted to a visualization unit 1118. In one or more examples, the visualization unit 1118 can be implemented either at the element containing the detection engine, or can be implemented at the central processor. Visualization unit 1118 can translate the determined matches into visualizations that can be applied to a graphical user interface (such as the example provided in FIG. 6). For instance, visualization unit 1118 can generate the display of the watch points in watch point interface 618 and can apply highlights 620 to the visual progress bar 602.

Figure 12:
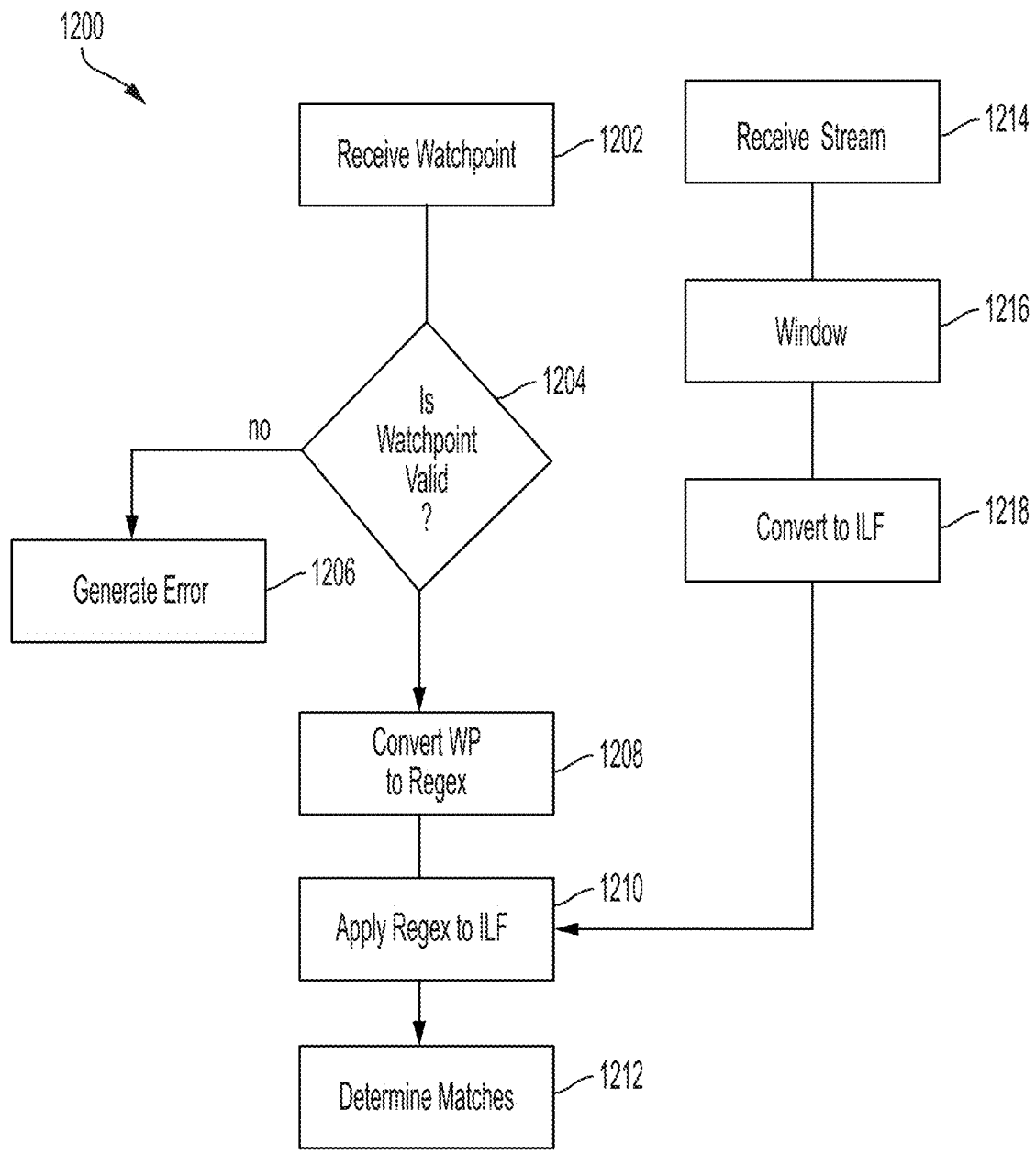
FIG. 12 illustrates an exemplary method for identifying patterns in a stream of communications between nodes of a distributed computing system according to examples of the disclosure.

FIG. 12 illustrates an exemplary method for identifying patterns in a stream of communications between nodes of a distributed computing system according to examples of the disclosure. The method 1200 can be implemented in one or more examples by the system described above with respect to FIG. 11. The method 1200 can begin at step 1202, wherein one or more watch points are received by a user of a replay debugger. The one or more watch points can be specified using a domain-specific language such as HBL, as described above.

After receiving the watch points at step 1202, the process can move to step 1204, wherein a determination can be made as to whether the one or more watch points received at step 1202 are valid. As described above with respect to FIG. 11, a watch point can be analyzed at step 1204 to determine whether the watch point contains any syntax errors, incomplete specification, inconsistent specifications, or incorrect specifications. If it is determined at step 1204 that watch points contain one or more errors as described above, the process can move to step 1206, wherein the user is alerted to the error in the watch point as described above with respect to FIG. 11.

If however, the watch point is found to not detect any errors at step 1204, the process can move to step 1208, wherein the watch point is converted from the domain-specific language such as HBL into a regular expression that will be ultimately used to search for matching patterns in the log files.

In parallel to receiving the watch points at step 1202, the method 1200 can also receive one or more data streams at step 1214. The data streams received at step 1214 can be generated from the execution of a distributed software program either in real time or at an earlier time as described above and can be stored in a buffer as described above. Each data stream received at step 1214 can be windowed at step 1216 as described above with respect to FIG. 11. Once the data stream has been windowed, the method 1200 can move to step 1218, wherein the windows can be converted into an ILF as described above with respect to FIG. 11.

Once the domain specific language specified watch points have been converted to regular expressions at step 1208, and the ILFs have been created at step 1218, the process can move to step 1210, wherein the regular expressions can be applied to the ILFs. In other words, at step 1210, the regular expressions are used to search for matching patterns in the ILFs.

After the regular expressions are used to find corresponding matches in the ILFs at step 1210, the process can move to step 1212, wherein the matches found in the ILFs are used to determine matches in the corresponding windows generated at step 1216, as described above with respect to FIG. 11. In other words, the matching patterns found in the ILFs are then identified within the original windows generated at step 1216 and in the manner described above with respect to FIG. 11. In this way, the patterns in the streaming data that match the conditions specified by the watch points are identified.

As described above, the process of determining matches with watch points can present challenges when dealing with streaming data. This can be because the data is streaming, and so it may take time for certain matching data to emerge from a data stream. In other words, a first window of streaming data may partially match a watch point condition, however in order to know if the event matches a watch point criteria, subsequent windows may need to be analyzed to see if they continue the pattern identified by the watch point. Thus, in one or more examples, the detection engines or processors determining matches with watch points may need to be able to account for the emerging nature of matches in streaming data.

Figure 13:
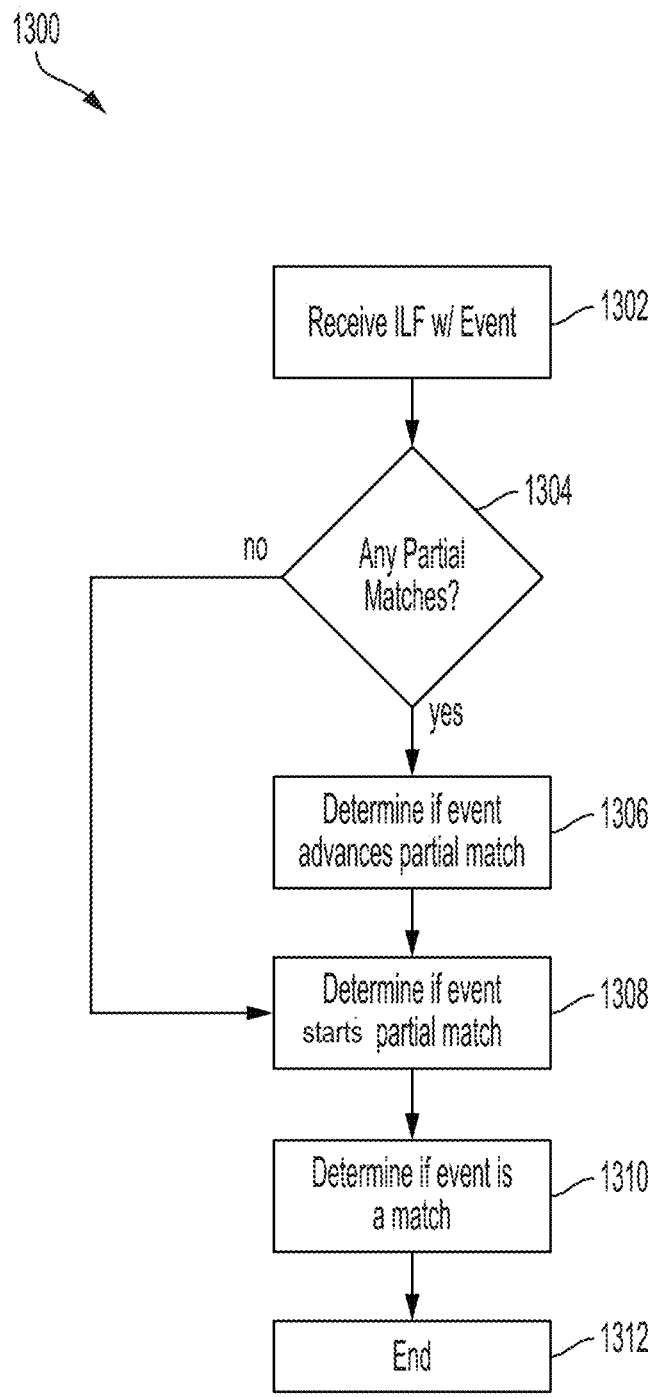
FIG. 13 illustrates an exemplary process for determining matches to a pattern in a stream of communications between nodes of a distributed computing system according to examples of the disclosure.

FIG. 13 illustrates an exemplary process for determining matches to a pattern in a stream of communications between nodes of a distributed computing system according to examples of the disclosure. In one or more examples, the process 1300 illustrated in FIG. 13 and described in further detail below can be used to compare streaming data with watch points to determine the presence of events that the user may want to be alerted about.

In one or more examples, the process 1300 can begin at step 1302 wherein an intermediate log file corresponding to a window is received. As discussed above with respect to FIGS. 11 and 12, a "window" of streaming data can be converted into an intermediate log file (ILF) for the purpose of comparison to a watch point or HBL expression. Thus, at step 1302, the process 1300 can receive the generated ILF which may include one or more events that occurred in the streaming data corresponding to the ILF.

Once the ILF file has been received at step 1302, the process can move to step 1304 wherein the system can determine if there are any pre-existing partial matches that have been previously stored by the system. As described above, as streaming data is generated by a distributed computing system, the data may initially partially match a watch point. For example, if a watch point required the presence of event A, then event B, and then event C, then as the data in a distributed system is being generated, at first the streaming data may initially match event A, but further data will be needed to see if the data eventually matches B then C in order for an alert to be generated. Thus, in one or more examples, at step 1304 the system can first determine if there are any previously identified partial matches that are stored in the system, thus requiring that the received ILF file received at step 1302 be analyzed to see if the event in the ILF advances the partial match. Using the example above, if previous ILF files matched event A, then the received ILF file would have to be analyzed to determine if the file matched event B, thereby advancing the partial match to a watch point that included A, B, and C.

In one or more examples, if a partial match is already stored in the system as determined at step 1304, then the process can move to step 1306, wherein a determination is made as to whether the event received in the ILF file at step 1302 advances any of the stored partial matches. As described above, advancing a partial match can refer to whether the event found in an ILF continues or completes an already partial match found in a watch point and stored by the system. At step 1306, if it is determined that the ILF under examination advances a partial match, then in one or more examples, the ILF file can be stored in a memory. Furthermore, in one or more examples, if the ILF under examination completes an already stored partial match, then in one or more examples, the ILF file can be stored in a memory, and an alert can be transmitted to a user of the system, alerting them to the presence of a condition in the streaming data that matches a predefined watch point.

Referring back to step 1304, if there are no previously stored partial matches, then in one or more examples, the process 1300 can skip step 1306 and move directly to step 1308 from step 1308. Additionally or alternatively, once a determination has been made to determine if an event expressed in a received ILF advances any previously stored partial matches at step 1306, the process can move to step 1308. At step 1308, a determination can be made as to whether the ILF event received at step 1302 is the beginning of a partial match to a watch point. Using the example above of a watch point requiring event A, then event B, then event C, at step 1308 the process 1300 can determine if the event expressed in the ILF received at step 1308 matches event A, thereby indicating the beginning partial match of pattern expressed in the watch point.

In one or more examples, at step 1308, if it is determined that the ILF partially matches a pattern expressed in one or more watch points, then the ILF can be stored in the memory of the system so that subsequent ILFs can be reviewed at step 1306 to see if the partial match identified currently at step 1308 have been advanced. In one or more examples, if the event does not start a partial match at step 1308, then the ILF can be discarded. In one or more examples, once process 1300 at step 1308 has determined whether or not the ILF received at step 1302 partially matches the beginning of a watch point pattern, the process can move to step 1310 to determine if the ILF completely matches a pattern expressed in a watch point. If at step 1310 the process matches a watch point pattern, then the system can transmit an alert to a user as described above with respect to FIGS. 11-12. Finally, in one or more examples, and once the ILF received at step 1302 has been analyzed to determine if it is a continuation of a previously found partial plan, a beginning partial match to a watch point, and/or a complete match to a watch point, the process 1300 can move to step 1312 wherein the process is terminated.

As described above, the speed required to perform debugging analysis on a data stream rather than on log files can require that all or some of the analytics be performed at the nodes of a distributed computing system, in contrast to a system in which the debugging analysis can be performed at a central processor. Distributing the analytics across nodes can be referred to as "edge computing." Edge computing can refer to the process of moving computation and data storage closer to the locations where it is needed rather than performing the entirety of the processing at a central location. As described in detail below, various edge computing architectures can be realized so as to facilitate the ability to perform debugging analysis on streaming data.

FIG. 14A-J illustrate exemplary architectures for implementing an edge computing detection scheme to identify patterns in a stream of communications between nodes of a distributed computing system according to examples of the disclosure. The examples provided by FIG. 14 can be implemented to facilitate streaming analytics on a distributed computing system as described with respect to FIGS. 10-12, but additionally, the examples provided in FIG. 14 can also be utilized to implement analysis on log files in the system and methods described above with respect to FIGS. 7-8.

Figure 14A:
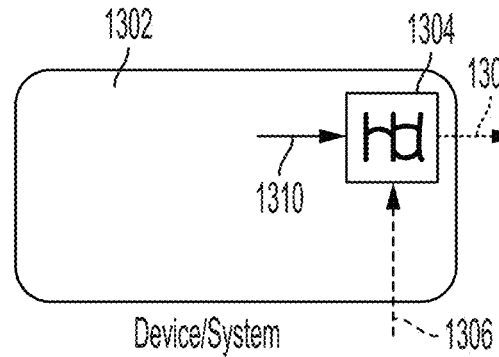
FIG. 14A-J illustrate exemplary architectures for implementing an edge computing detection scheme to identify patterns in a stream of communications between nodes of a distributed computing system according to examples of the disclosure.

FIG. 14a illustrates a device 1402 which can represent a single computing device of a distributed computing system. In one or more examples, device 1402 can include an analytics cell 1404. Analytics cell 1404 can include the software and algorithms required to implement the debugging of a stream of data as described above. In one or more examples, analytics cell 1404 can include an input 1410 that receives the streaming data to be transmitted to a another computing device. The analytics cell can also include an input 1406 that can be configured to receive watch points from a central processor, thereby providing the analytics cell with the predefined patterns to search for when performing debugging analysis on a stream. In one or more examples, analytics cell 1404 can include an output 1408 that can be configured to output matching patterns for use by either the user (in the form of an alert) and/or can be used by a central processor for further processing.

Figure 14B:
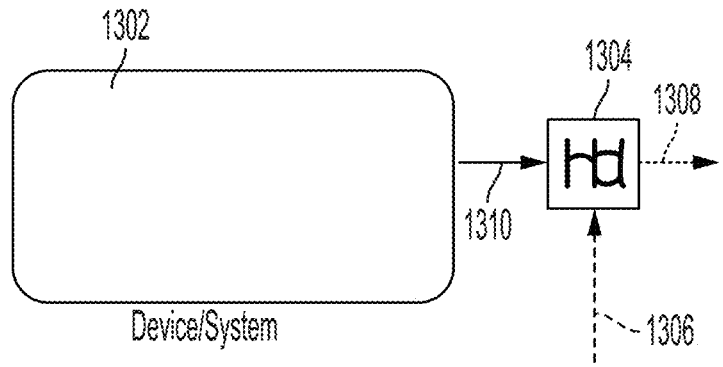

FIG. 14B illustrates an exemplary analytic cell 1404 which can be implemented externally from a device 1402. In one or more examples, the data from the device 1402 can be transmitted externally by the device 1402 to the analytics cell 1404 at input 1410. In this way, rather than occupying memory and the processing capabilities of device 1402, the analytics cell can be implemented externally from the device 1402, thereby utilizing less resources of the device 1402.

Figure 14C:
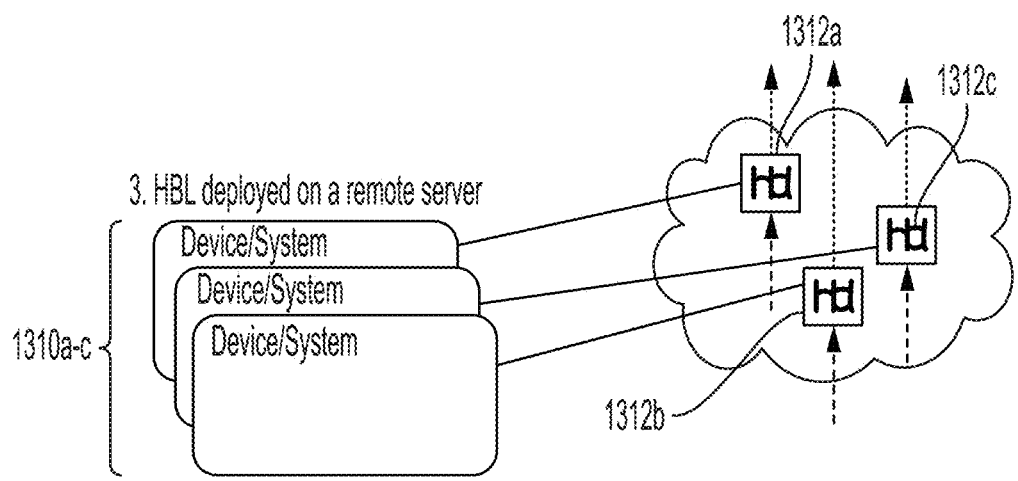

FIG. 14C illustrates an exemplary system in which each analytics engine 1412a-c can be implemented and deployed in a single remote server or cloud computing instance, and each device 1410a-c can transmit the streaming data to the single remote server.

Figure 14D:
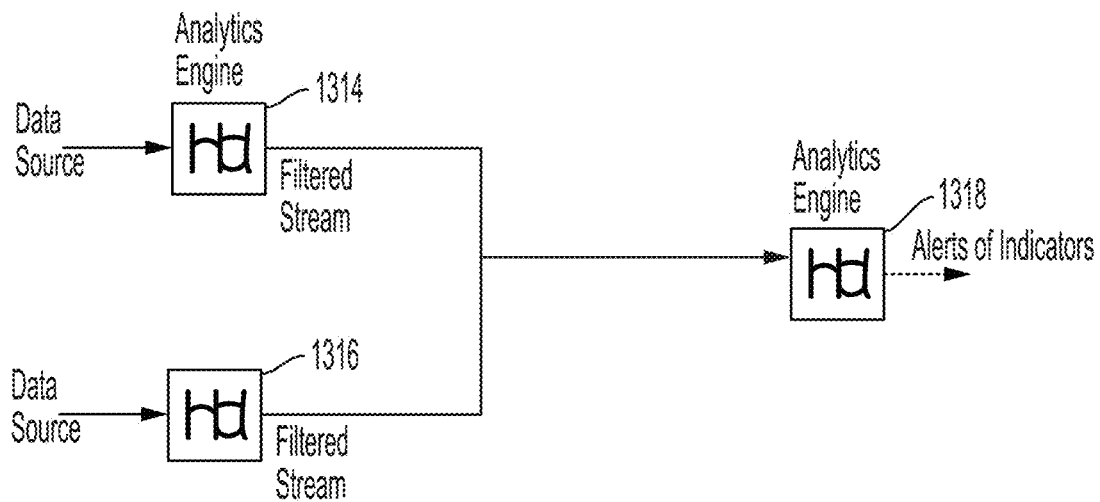

FIG. 14D illustrates an exemplary interconnection scheme that can be implemented internally or externally to a device. In one or more examples, stream filtering can be used to collect the relevant data (i.e., parts of stream that match a specified watch point) from an event stream. It can also be used to combine an event stream data with another event stream data. For example, analytic cell 1414 can detect relevant data from a first stream, while analytic cell 1416 can detect relevant data from a second stream. Any of these streams of data may be a filtered stream of events derived from the raw stream. Any data found to be matching be either analytic cell 1414 and 1416 can then be transmitted to a third analytic cell 1418 which can analyze the combined stream to further detect any patterns in the data specified by a user watch point. An example of using such stream filtering is to identify concurrently occurring events in two separate source streams. Combining streams can require that the separate data sources use clocks whose timing is comparable: either because they have known drift or skew and jitter, or have been synchronized.

Figure 14E:
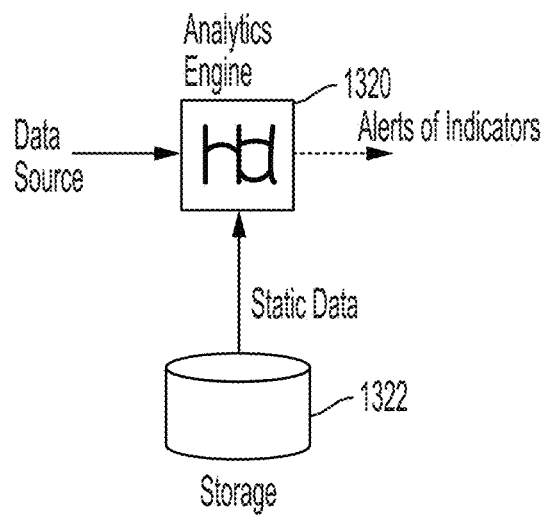

FIG. 14E illustrates an exemplary analytic cell implementation that utilizes "data fusion" according to examples of the disclosure. In the example of FIG. 14E, the analytic cell 1420 can combine the streaming data with static data stored in a data store 1422 so as to provide the user with more information about any alerts generated by the analytic cell 1420. For example, in a navigation context, the data store 1422 can include data about the latitude and longitude of the device, which can be "fused" with any streaming data so that if an alert is generated, then user can be made aware of the location of the device when the alert was generated.

Figure 14F:
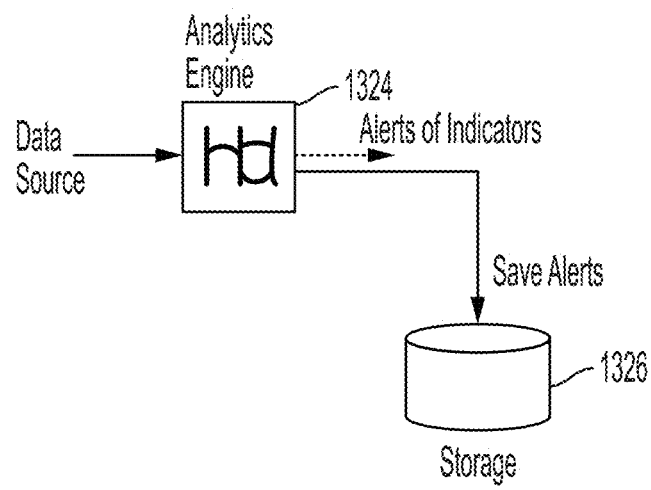

FIG. 14F illustrates an exemplary analytic cell implementation in which alerts generated by an analytic cell can be stored in a persistent data store. In one or more examples, the example of FIG. 14F can include an analytic cell 1424 that can generate alerts which in one or more examples can store the alerts in a data store 1426. In one or more examples, the data stored in data store 1426 can be stored as a log file that can be accessed later on and even replayed. The system of FIG. 14F can allow for generated alerts to be processed later by the system and may be useful in contexts where the computing device which pertains to the analytic cell 1424 may be disconnected from a central processor or other computing device.

Figure 14G:
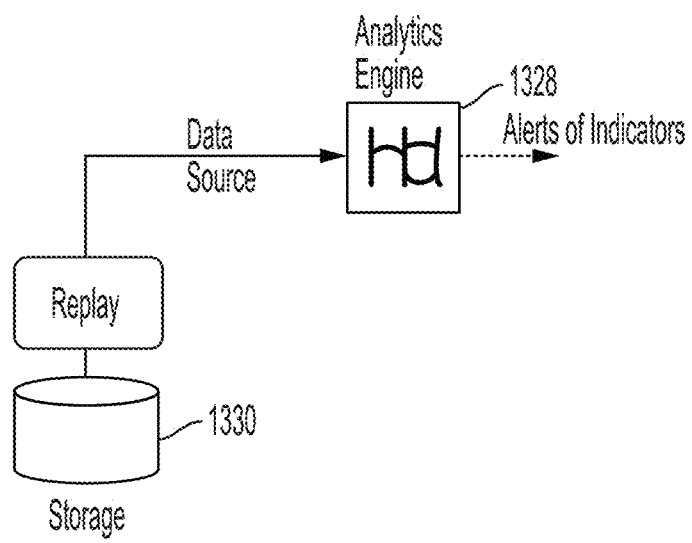

FIG. 14G illustrates an exemplary analytic cell in which the input stream can be stored in a data store and replayed to the analytic cell according to examples of the disclosure. In one or more examples, rather than processing streaming data, the analytic cell 1428 can process data stored in a data store 1430. The data stored in data store 1430 can be "replayed" at a later time to the analytic cell 1428. In one or more examples, the data stored in data store 1430 can be saved in the same format as when the data was transmitted, and may not be required to be converted into a log file.

Figure 14H:
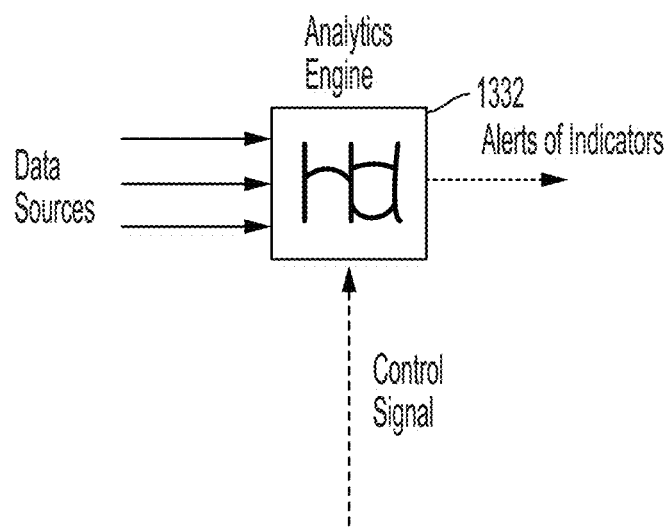
Figure 14I:
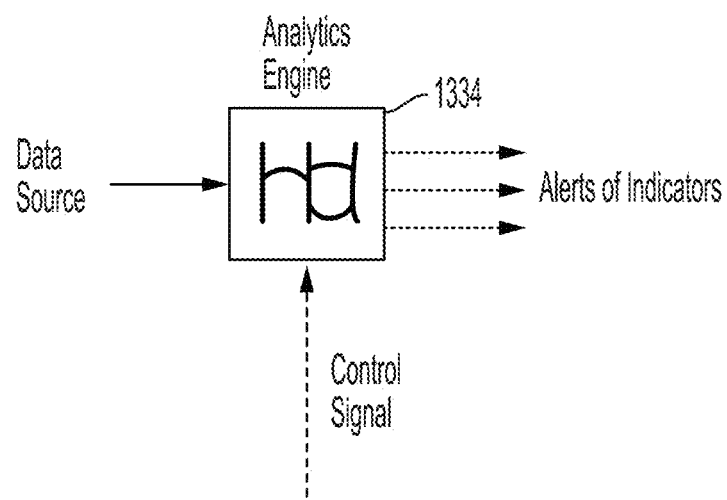

FIGS. 14H and 14I illustrates various input and output examples of an analytics cell according to examples of the disclosure. In the example of FIG. 14H, the analytic cell 1432 can receive streaming data from a plurality of data sources and can generate a single alert if any of the received streams match a pattern specified by a predefined watch point. In the example of 141, the analytic cell 1434 can receive data from a single stream, but can generate a plurality of alerts that can be transmitted to various devices and processors in the distributed system, as well as one or more users.

Figure 14J:
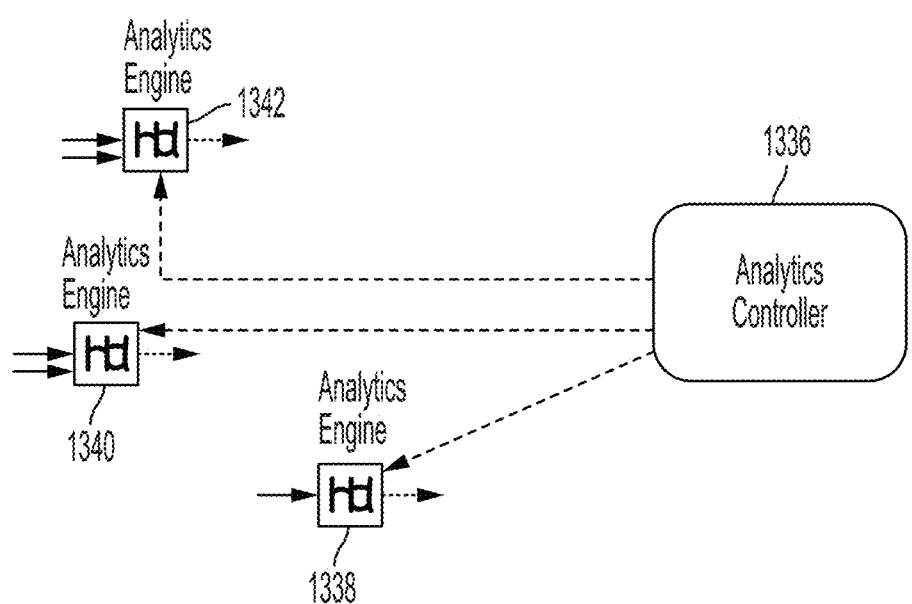

FIG. 14J illustrates an exemplary system for coordinating analytic cells distributed across a plurality of computing devices according to examples of the disclosure. In one or more examples, analytics controller 1436 can be connected to a plurality of analytic cells 1438, 1440, and 1442 so as to control each of the cells. In one or more examples, the analytics controller 1436 can receive information from each of the analytic cells 1438, 1440, and 1442 so as to display outputs from each cell, and can also provide watch points to each of the analytic cells as described above. In one or more examples, analytic cells 1438, 1440, and 1442 can be implemented in any of the manners described above. In one or more examples, the output of any one of analytics engine 1438, 1440, and 1442 can be connected to the input of any one of analytics engine 1438, 1440, and 1442 so as to create a complex network of analytic cells that can be collectively configured to detect patterns of data being transmitted across a distributed computing system.

Figure 15:
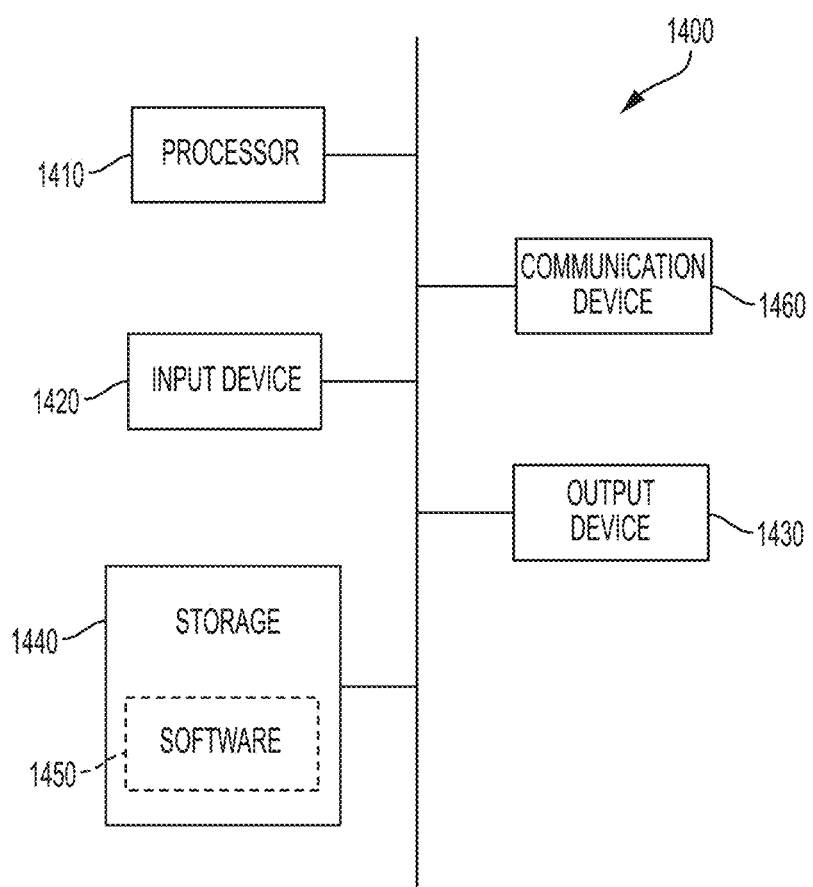
FIG. 15 illustrates an example of a computing device in accordance with one embodiment.

FIG. 15 illustrates an example of a computing device in accordance with one embodiment. Device 1500 can be a host computer connected to a network. Device 1500 can be a client computer or a server. As shown in FIG. 15, device 1500 can be any suitable type of microprocessor-based device, such as a personal computer, workstation, server, or handheld computing device (portable electronic device) such as a phone or tablet. The device can include, for example, one or more of processor 1510, input device 1520, output device 1530, storage 1540, and communication device 1560. Input device 1520 and output device 1530 can generally correspond to those described above and can either be connectable or integrated with the computer.

Input device 1520 can be any suitable device that provides input, such as a touch screen, keyboard or keypad, mouse, or voice-recognition device. Output device 1530 can be any suitable device that provides output, such as a touch screen, haptics device, or speaker.

Storage 1540 can be any suitable device that provides storage, such as an electrical, magnetic, or optical memory, including a RAM, cache, hard drive, or removable storage disk. Communication device 1560 can include any suitable device capable of transmitting and receiving signals over a network, such as a network interface chip or device. The components of the computer can be connected in any suitable manner, such as via a physical bus or wirelessly.

Software 1550, which can be stored in storage 1540 and executed by processor 1510, can include, for example, the programming that embodies the functionality of the present disclosure (e.g., as embodied in the devices as described above).

Software 1550 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1540, that can contain or store programming for use by or in connection with an instruction execution system, apparatus, or device.

Software 1550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1500 can implement any operating system suitable for operating on the network. Software 1550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

According to some examples of the disclosure, the systems and methods can include a method, comprising: receiving one or more data transmissions between a plurality of devices in a distributed computing system, receiving one or more watch points, wherein the one or more watch points are specified in a domain-specific language, converting the one or more watch points into one or more regular expressions, determining the presence of one or more patterns within the received one or more data transmissions based on the one or more regular expressions; and generating one or more alerts if it is determined that one or more patterns are present within the received one or more data transmissions. In one or more examples, determining the presence of one or more patterns within the received one or more data transmissions based on the one or more regular expressions includes determining if the received one or more data transmissions partially matches a pattern identified by the one or more regular expressions. In one or more examples, determining if the one or more data transmissions partially matches a pattern identified by the one or more regular expressions includes determining if the received one or more data transmissions continues a partially matched pattern found in a previously received data transmission. In one or more examples, determining the presence of one or more patterns within the received one or more data transmissions based on the one or more regular expressions includes determining if the one or more data transmissions completely matches a pattern identified by the one or more regular expressions. In one or more examples, the method further comprises adding the received one or more data transmissions to one or more previously received data transmission to generate a window of data transmissions, wherein the amount of data contained within a window is based on a predefined threshold. In one or more examples, wherein the method further comprises converting the data contained within a window into an intermediate log file format. In one or more examples, determining the presence of one or more patterns within the received one or more data transmissions based on the one or more regular expressions includes determining the presence of the one or more patterns within the intermediate log file based on the one or more regular expressions. In one or more examples, wherein receiving one or more data transmissions between a plurality of devices in a distributed computing system includes receiving the one or more data transmissions at a detection engine implemented on a device of plurality of devices in a distributed computing system. In one or more examples, generating one or more alerts if it is determined that one or more patterns are present within the received one or more data transmissions includes displaying a visual representation of the alert on a display of an electronic device. In one or more examples, determining the presence of one or more patterns within the received one or more data transmissions based on the one or more regular expressions includes discarding the one or more data transmissions from a memory of a device if it is determined that the one or more data transmissions does not match the one or more patterns based on the one or more regular expressions. In one or more examples, receiving one or more data transmissions between a plurality of devices in a distributed computing system includes receiving the one or more data transmissions at a detection engine implemented on a device of plurality of devices in a distributed computing system. In one or more examples, generating one or more alerts if it is determined that one or more patterns are present within the received one or more data transmissions includes displaying a visual representation of the alert on a display of an electronic device. In one or more examples, determining the presence of one or more patterns within the received one or more data transmissions based on the one or more regular expressions includes discarding the one or more data transmissions from a memory of a device if it is determined that the one or more data transmissions does not match the one or more patterns based on the one or more regular expressions.

According to some examples of the disclosure, the systems and methods can include a a computing system, comprising: a memory, one or more processors, and one or more programs, wherein the one or more programs are stored in the memory and configured to be executed by the one or more processors, the one or more programs when executed by the one or more processors cause the processor to: receive one or more data transmissions between a plurality of devices in a distributed computing system, receive one or more watch points, wherein the one or more watch points are specified in a domain-specific language, convert the one or more watch points into one or more regular expressions, determine the presence of one or more patterns within the received one or more data transmissions based on the one or more regular expressions; and generate one or more alerts if it is determined that one or more patterns are present within the received one or more data transmissions. In one or more examples, determining the presence of one or more patterns within the received one or more data transmissions based on the one or more regular expressions includes determining if the received one or more data transmissions partially matches a pattern identified by the one or more regular expressions. In one or more examples, determining if the one or more data transmissions partially matches a pattern identified by the one or more regular expressions includes determining if the received one or more data transmissions continues a partially matched pattern found in a previously received data transmission. In one or more examples, determining the presence of one or more patterns within the received one or more data transmissions based on the one or more regular expressions includes determining if the one or more data transmissions completely matches a pattern identified by the one or more regular expressions. In one or more examples, the processor can be further caused to add the received one or more data transmissions to one or more previously received data transmission to generate a window of data transmissions, wherein the amount of data contained within a window is based on a predefined threshold. In one or more examples, wherein the processor can be further caused to convert the data contained within a window into an intermediate log file format. In one or more examples, determining the presence of one or more patterns within the received one or more data transmissions based on the one or more regular expressions includes determining the presence of the one or more patterns within the intermediate log file based on the one or more regular expressions. In one or more examples, wherein receiving one or more data transmissions between a plurality of devices in a distributed computing system includes receiving the one or more data transmissions at a detection engine implemented on a device of plurality of devices in a distributed computing system. In one or more examples, generating one or more alerts if it is determined that one or more patterns are present within the received one or more data transmissions includes displaying a visual representation of the alert on a display of an electronic device. In one or more examples, determining the presence of one or more patterns within the received one or more data transmissions based on the one or more regular expressions includes discarding the one or more data transmissions from a memory of a device if it is determined that the one or more data transmissions does not match the one or more patterns based on the one or more regular expressions. In one or more examples, receiving one or more data transmissions between a plurality of devices in a distributed computing system includes receiving the one or more data transmissions at a detection engine implemented on a device of plurality of devices in a distributed computing system. In one or more examples, generating one or more alerts if it is determined that one or more patterns are present within the received one or more data transmissions includes displaying a visual representation of the alert on a display of an electronic device. In one or more examples, determining the presence of one or more patterns within the received one or more data transmissions based on the one or more regular expressions includes discarding the one or more data transmissions from a memory of a device if it is determined that the one or more data transmissions does not match the one or more patterns based on the one or more regular expressions.

According to some examples of the disclosure, the systems and methods include a non-transitory computer readable storage medium storing one or more programs, the one or more programs comprising instructions, which, when executed by an electronic device with a display and a user input interface, cause the device to receive one or more data transmissions between a plurality of devices in a distributed computing system, receive one or more watch points, wherein the one or more watch points are specified in a domain-specific language, convert the one or more watch points into one or more regular expressions, determine the presence of one or more patterns within the received one or more data transmissions based on the one or more regular expressions; and generate one or more alerts if it is determined that one or more patterns are present within the received one or more data transmissions. In one or more examples, determining the presence of one or more patterns within the received one or more data transmissions based on the one or more regular expressions includes determining if the received one or more data transmissions partially matches a pattern identified by the one or more regular expressions. In one or more examples, determining if the one or more data transmissions partially matches a pattern identified by the one or more regular expressions includes determining if the received one or more data transmissions continues a partially matched pattern found in a previously received data transmission. In one or more examples, determining the presence of one or more patterns within the received one or more data transmissions based on the one or more regular expressions includes determining if the one or more data transmissions completely matches a pattern identified by the one or more regular expressions. In one or more examples, the processor can be further caused to add the received one or more data transmissions to one or more previously received data transmission to generate a window of data transmissions, wherein the amount of data contained within a window is based on a predefined threshold. In one or more examples, wherein the processor can be further caused to convert the data contained within a window into an intermediate log file format. In one or more examples, determining the presence of one or more patterns within the received one or more data transmissions based on the one or more regular expressions includes determining the presence of the one or more patterns within the intermediate log file based on the one or more regular expressions. In one or more examples, wherein receiving one or more data transmissions between a plurality of devices in a distributed computing system includes receiving the one or more data transmissions at a detection engine implemented on a device of plurality of devices in a distributed computing system. In one or more examples, generating one or more alerts if it is determined that one or more patterns are present within the received one or more data transmissions includes displaying a visual representation of the alert on a display of an electronic device. In one or more examples, determining the presence of one or more patterns within the received one or more data transmissions based on the one or more regular expressions includes discarding the one or more data transmissions from a memory of a device if it is determined that the one or more data transmissions does not match the one or more patterns based on the one or more regular expressions. In one or more examples, receiving one or more data transmissions between a plurality of devices in a distributed computing system includes receiving the one or more data transmissions at a detection engine implemented on a device of plurality of devices in a distributed computing system. In one or more examples, generating one or more alerts if it is determined that one or more patterns are present within the received one or more data transmissions includes displaying a visual representation of the alert on a display of an electronic device. In one or more examples, determining the presence of one or more patterns within the received one or more data transmissions based on the one or more regular expressions includes discarding the one or more data transmissions from a memory of a device if it is determined that the one or more data transmissions does not match the one or more patterns based on the one or more regular expressions.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A method, comprising:
receiving one or more messages communicated between components of a distributed computing system, wherein the distributed computing system comprises a plurality of components, wherein each component implements a portion of a functionality of a software program running on the distributed computing system;
receiving one or more watch points, wherein the one or more watch points are specified in a domain-specific language, and wherein the one or more watch points comprise one or more conditions to be searched for in the received one or more messages;
converting the one or more watch points into one or more regular expressions, wherein converting the one or more watch points into one or more regular expressions comprises mapping the domain-specific language specification of the one or more watch points into the one or more regular expressions;
determining a presence of one or more patterns within the received one or more messages based on the one or more regular expressions, wherein determining the presence of one or more patterns within the received one or more messages based on the one or more regular expressions includes determining if the received one or more messages partially matches a pattern identified by the one or more regular expressions; and
generating one or more alerts if it is determined that one or more patterns are present within the received one or more messages.

2. The method of claim 1, wherein determining if the one or more messages partially matches a pattern identified by the one or more regular expressions includes determining if the received one or more messages continues a partially matched pattern found in a previously received message.

3. The method of claim 1, wherein determining the presence of one or more patterns within the received one or more messages based on the one or more regular expressions includes determining if the one or more messages completely matches a pattern identified by the one or more regular expressions.

4. The method of claim 1, wherein the method further comprises adding the received one or more messages to one or more previously received messages to generate a window of messages, wherein the number of messages contained within a window is based on a predefined threshold.

5. The method of claim 4, wherein the method further comprises converting the messages contained within a window into an intermediate log file format.

6. The method of claim 5, wherein determining the presence of one or more patterns within the received one or more messages based on the one or more regular expressions includes determining the presence of the one or more patterns within the intermediate log file based on the one or more regular expressions.

7. The method of claim 1, wherein receiving one or more messages communicated between components of a distributed computing system includes receiving the one or more messages at a detection engine implemented on a device or plurality of devices in a distributed computing system.

8. The method of claim 1, wherein generating one or more alerts if it is determined that one or more patterns are present within the received one or more messages includes displaying a visual representation of the alert on a display of an electronic device.

9. The method of claim 1, wherein determining the presence of one or more patterns within the received one or more messages based on the one or more regular expressions includes discarding the one or more messages from a memory of a device if it is determined that the one or more messages does not match the one or more patterns based on the one or more regular expressions.

10. A computing system, comprising:
a memory;
one or more processors; and
one or more programs, wherein the one or more programs are stored in the memory and configured to be executed by the one or more processors, the one or more programs when executed by the one or more processors cause the processor to:
receive one or more messages communicated between components of a distributed computing system, wherein the distributed computing system comprises a plurality of components, wherein each component implements a portion of a functionality of a software program running on the distributed computing system;
receive one or more watch points, wherein the one or more watch points are specified in a domain-specific language, and wherein the one or more watch points comprise one or more conditions to be searched for in the received one or more messages;
convert the one or more watch points into one or more regular expressions, wherein converting the one or more watch points into one or more regular expressions comprises mapping the domain-specific language specification of the one or more watch points into the one or more regular expressions;
determine a presence of one or more patterns within the received one or more messages based on the one or more regular expressions, wherein determining the presence of one or more patterns within the received one or more messages based on the one or more regular expressions includes determining if the received one or more messages partially matches a pattern identified by the one or more regular expressions; and
generate one or more alerts if it is determined that one or more patterns are present within the received one or more messages.

11. The system of claim 10, wherein determining if the one or more messages partially matches a pattern identified by the one or more regular expressions includes determining if the received one or more messages continues a partially matched pattern found in a previously received message.

12. The system of claim 10, wherein determining the presence of one or more patterns within the received one or more messages based on the one or more regular expressions includes determining if the one or more messages completely matches a pattern identified by the one or more regular expressions.

13. The system of claim 10, wherein the method further comprises adding the received one or more messages to one or more previously received messages to generate a window of messages, wherein the number of messages contained within a window is based on a predefined threshold.

14. The system of claim 13, wherein the method further comprises converting the messages contained within a window into an intermediate log file format.

15. The system of claim 14, wherein determining the presence of one or more patterns within the received one or more messages based on the one or more regular expressions includes determining the presence of the one or more patterns within the intermediate log file based on the one or more regular expressions.

16. The system of claim 10, wherein receiving one or more messages communicated between components of a distributed computing system includes receiving the one or more messages at a detection engine implemented on a device or plurality of devices in a distributed computing system.

17. The system of claim 10, wherein generating one or more alerts if it is determined that one or more patterns are present within the received one or more messages includes displaying a visual representation of the alert on a display of an electronic device.

18. The system of claim 10, wherein determining the presence of one or more patterns within the received one or more messages based on the one or more regular expressions includes discarding the one or more messages from a memory of a device if it is determined that the one or more messages does not match the one or more patterns based on the one or more regular expressions.

19. A computer readable storage medium storing one or more programs, the one or more programs comprising instructions, which, when executed by an electronic device with a display and a user input interface, cause the device to:
receive one or more messages communicated between components of a distributed computing system, wherein the distributed computing system comprises a plurality of components, wherein each component implements a portion of a functionality of a software program running on the distributed computing system;
receive one or more watch points, wherein the one or more watch points are specified in a domain-specific language, and wherein the one or more watch points comprise one or more conditions to be searched for in the received one or more messages;
convert the one or more watch points into one or more regular expressions, wherein converting the one or more watch points into one or more regular expressions comprises mapping the domain-specific language specification of the one or more watch points into the one or more regular expressions;
determine a presence of one or more patterns within the received one or more messages based on the one or more regular expressions, wherein determining the presence of one or more patterns within the received one or more messages based on the one or more regular expressions includes determining if the received one or more messages partially matches a pattern identified by the one or more regular expressions; and
generate one or more alerts if it is determined that one or more patterns are present within the received one or more messages.

20. The computer readable storage medium of claim 19, wherein determining if the one or more messages partially matches a pattern identified by the one or more regular expressions includes determining if the received one or more messages continues a partially matched pattern found in a previously received message.

21. The computer readable storage medium of claim 19, wherein determining the presence of one or more patterns within the received one or more messages based on the one or more regular expressions includes determining if the one or more messages completely matches a pattern identified by the one or more regular expressions.

22. The computer readable storage medium of claim 19, wherein the method further comprises adding the received one or more messages to one or more previously received messages to generate a window of messages, wherein the number of messages contained within a window is based on a predefined threshold.

23. The computer readable storage medium of claim 22, wherein the method further comprises converting the messages contained within a window into an intermediate log file format.

24. The computer readable storage medium of claim 23, wherein determining the presence of one or more patterns within the received one or more messages based on the one or more regular expressions includes determining the presence of the one or more patterns within the intermediate log file based on the one or more regular expressions.

25. The computer readable storage medium of claim 19, wherein receiving one or more messages communicated between components of a distributed computing system includes receiving the one or more messages at a detection engine implemented on a device or plurality of devices in a distributed computing system.

26. The computer readable storage medium of claim 19, wherein generating one or more alerts if it is determined that one or more patterns are present within the received one or more messages includes displaying a visual representation of the alert on a display of an electronic device.

27. The computer readable storage medium of claim 19, wherein determining the presence of one or more patterns within the received one or more messages based on the one or more regular expressions includes discarding the one or more messages from a memory of a device if it is determined that the one or more messages does not match the one or more patterns based on the one or more regular expressions.

* * * * *